United States Patent
Xu et al.

(10) Patent No.: US 12,184,435 B2
(45) Date of Patent: Dec. 31, 2024

(54) ON-MACHINE INDUSTRIAL SPE NETWORK SYSTEM AND METHOD

(71) Applicant: ROCKWELL AUTOMATION TECHNOLOGIES, INC., Mayfield Heights, OH (US)

(72) Inventors: Dayin Xu, Shanghai (CN); Katherine L. Sokolnicki, Chelmsford, MA (US); David D. Brandt, Milwaukee, WI (US); Rebecca R. Jaeger, Chelmsford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 361 days.

(21) Appl. No.: 17/691,955

(22) Filed: Mar. 10, 2022

(65) Prior Publication Data

US 2023/0291588 A1 Sep. 14, 2023

(51) Int. Cl.
*H04L 12/10* (2006.01)
*G05B 19/418* (2006.01)
*H04L 101/668* (2022.01)

(52) U.S. Cl.
CPC ........ *H04L 12/10* (2013.01); *G05B 19/41855* (2013.01); *H04L 2101/668* (2022.05)

(58) Field of Classification Search
CPC ........ G05B 19/41855; H04L 2101/668; H04L 12/10
USPC ........................................... 370/463
See application file for complete search history.

(56) References Cited

U.S. PATENT DOCUMENTS

| | | | | |
|---|---|---|---|---|
| 2009/0154501 A1* | 6/2009 | Roberson | .............. | H04L 41/342 370/498 |
| 2017/0195756 A1* | 7/2017 | Schemmann | ...... | H04Q 11/0005 |
| 2020/0235780 A1* | 7/2020 | Bains | ....................... | H04B 3/23 |
| 2022/0013932 A1* | 1/2022 | Matcha | ................ | H01R 9/0509 |
| 2023/0098106 A1* | 3/2023 | Peterson | ............ | G05B 19/4183 318/66 |

FOREIGN PATENT DOCUMENTS

DE 102019127195 A1 4/2021

OTHER PUBLICATIONS

DiMinico, Chris; MC Communications; SPE Multidrop Enhancements Mixing Segment Considerations Trunk Connection, Apr. 2021 (Year: 2021).*
EtherCAT Technology Group, EtherCAT P—Power and Communication Combined, https://www.ethercat.org/en/ethercat-p.html, printed Jul. 27, 2022, 1 page.

(Continued)

*Primary Examiner* — Peter G Solinsky
(74) *Attorney, Agent, or Firm* — Quarles & Brady LLP

(57) ABSTRACT

An industrial Single Pair Ethernet (SPE) system and method for connecting devices within an industrial automation system is provided. The industrial SPE system comprises a trunkline formed by a series of trunk cables, where each trunk cable includes a power pair and an SPE pair, and one or more taps connected between the trunk cables of the trunkline. The industrial SPE system further comprises a drop line connected to each of the one or more taps, and a device connected to each of one or more taps via the drop lines. The device is an actuator or a sensor, and at least one of the device and the one or more taps includes a dual-port SPE switch.

20 Claims, 13 Drawing Sheets

(56) References Cited

OTHER PUBLICATIONS

Perinet, Seamless IoT Connectivity, https://www.perinet.io/en, printed Jul. 27, 2022, 1 page.
European Patent Office, Extended Search Report, Application No. 23156794.2, Jul. 18, 2023, 8 pages.

* cited by examiner

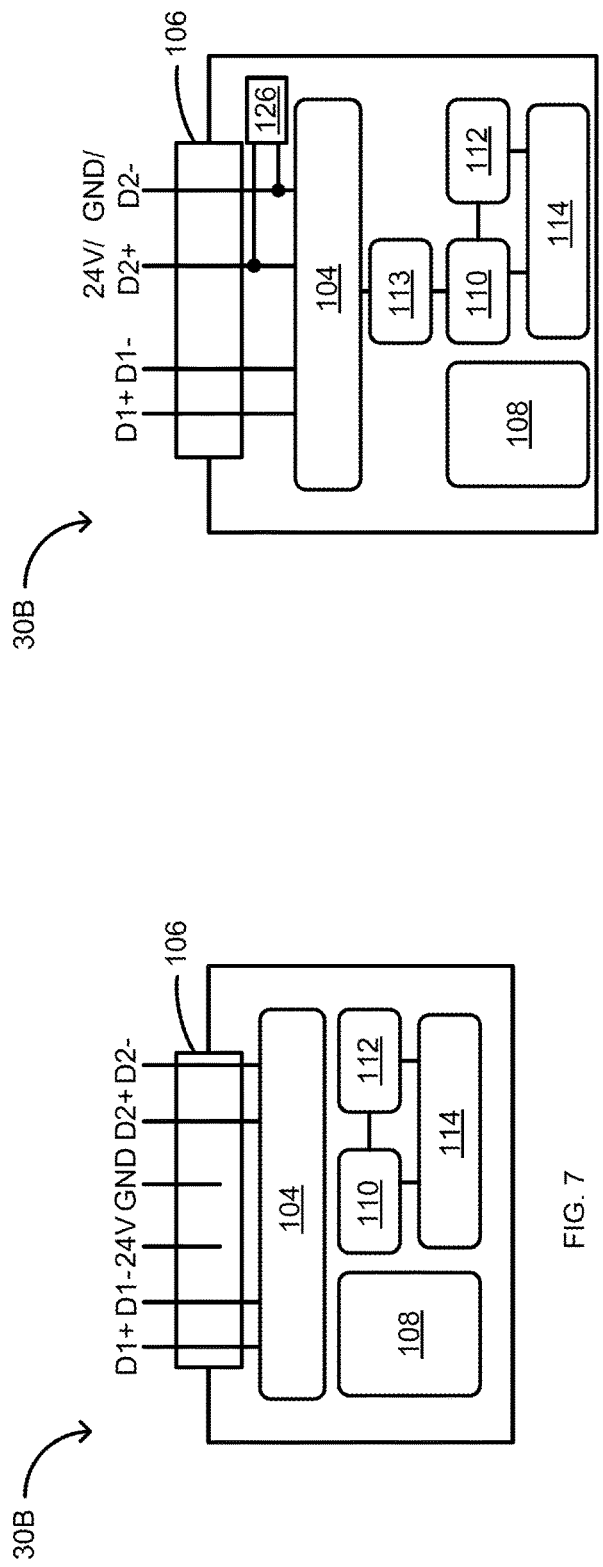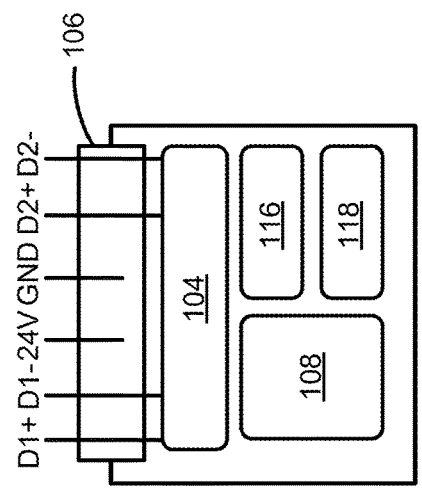

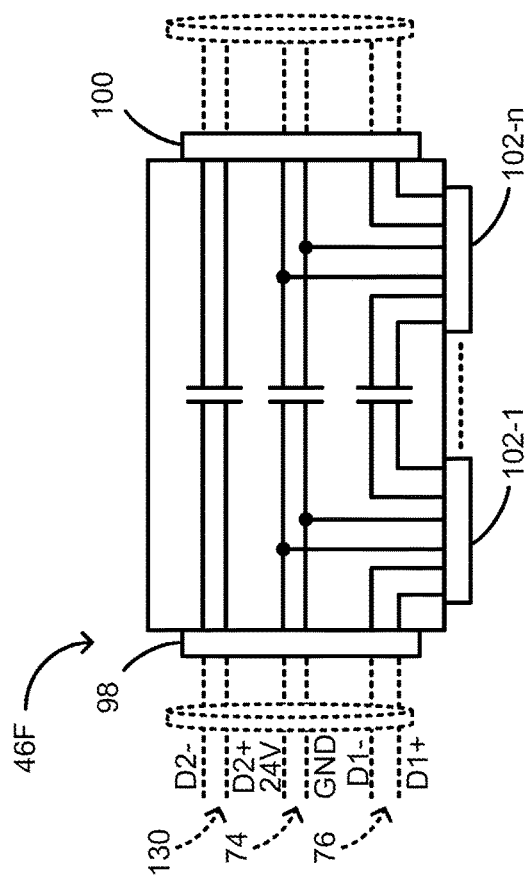
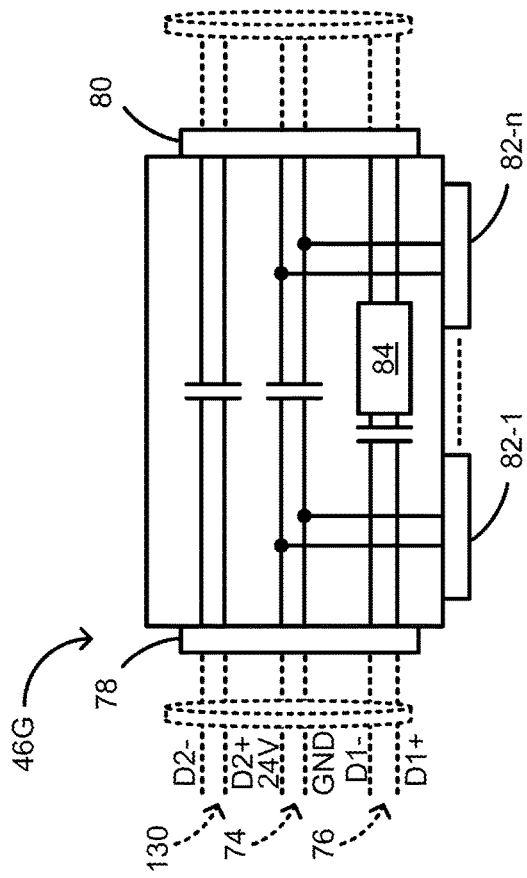

ON-MACHINE INDUSTRIAL SPE NETWORK SYSTEM AND METHOD

CROSS-REFERENCE TO RELATED APPLICATIONS

Not applicable.

STATEMENT REGARDING FEDERALLY SPONSORED RESEARCH

Not Applicable

BACKGROUND

The present disclosure relates generally to single pair Ethernet (SPE) network infrastructures for industrial automation systems. More specifically, the present disclosure relates to on-machine industrial SPE networks for efficiently integrating both analog and digital sensors and switches into the industrial automation system to enable full system connectivity from the automation system controller to a last hop device.

Industrial automation systems may be used to provide automated control of one or more actuators. A controller may output a conditioned power signal to an actuator to control movement of the actuator. The controller may also receive signals from sensors connected to the system for diagnostics, machine health, safety, etc. By transforming these field sensors and actuators from analog devices to interactive digital devices, better control and information integration can be achieved. However, there is a need for a way to efficiently integrate such devices into the network infrastructure of current systems that enables their intelligent use.

BRIEF DESCRIPTION

In some embodiments, an industrial Single Pair Ethernet (SPE) system to be installed within an industrial automation system is provided. The industrial SPE system comprises a linking device, a first device (one of a sensor and an actuator), a second device (one of a sensor and an actuator), and a trunk-drop infrastructure connecting the first device and the second device to the linking device. The trunk-drop infrastructure comprises a first tap, a first drop cable connecting the first tap to the first device, a second tap, a second drop cable connecting the second tap to the second device, a trunk cable connected between the linking device, the first tap, and the second tap, and an end cap connected to the second tap. The trunk cable includes a first pair of cables configured to transmit power and a second pair of cables configured as single pair ethernet cables. At least one of the first device, the second device, the first tap, and the second tap includes a dual-port SPE switch.

In some embodiments, a method of forming an SPE network within an industrial automation system is provided. The method includes forming an IP subnet trunkline using trunk cables having a power cable pair and an SPE cable pair and connecting a first device to the IP subnet trunkline by connecting a first pair of trunk ports of a first tap to the trunk cables, connecting a first drop port of the first tap to a first drop cable, and connecting the first device to the first drop cable. The method also includes connecting a second device to the IP subnet trunkline by connecting one of a second pair of trunk ports of a second tap to the trunk cables, connecting a second drop port of the second tap to a second drop cable, and connecting the second device to the second drop cable. At least one of the first device, the second device, the first tap, and the second tap includes a dual-port SPE switch. The method further includes connecting an end cap to another one of the second pair of trunk ports of the second tap, and connecting one of the trunk cables to a linking device that is connected to a wired network of the industrial automation system.

In some embodiments, an industrial SPE system for connecting devices within an industrial automation system is provided. The industrial SPE system comprises a trunkline formed by a series of trunk cables, where each trunk cable in the series of trunk cables includes a power pair and an SPE pair, and one or more taps connected between the trunk cables of the trunkline. The industrial SPE system further comprises a drop line connected to each of the one or more taps, and a device connected to each of one or more taps via the drop lines. The device is an actuator or a sensor, and at least one of the device and the one or more taps includes a dual-port SPE switch.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings, wherein:

FIG. 7 is a schematic view illustrating further detail of an SPE safety sensor, according to some embodiments, for use with the SPE system;

FIG. 8 is a schematic view illustrating further detail of another SPE safety sensor, according to some embodiments, for use with the SPE system;

FIG. 9 is a schematic view illustrating further detail of an SPE standard sensor, according to some embodiments, for use with the SPE system;

FIG. 16 is a schematic view of a multi-drop passive tap, according to some embodiments, for use with the SPE system;

FIG. 17 is a schematic view of a multi-drop SPE tap, according to some embodiments, for use with the SPE system;

DETAILED DESCRIPTION

Figure 1:
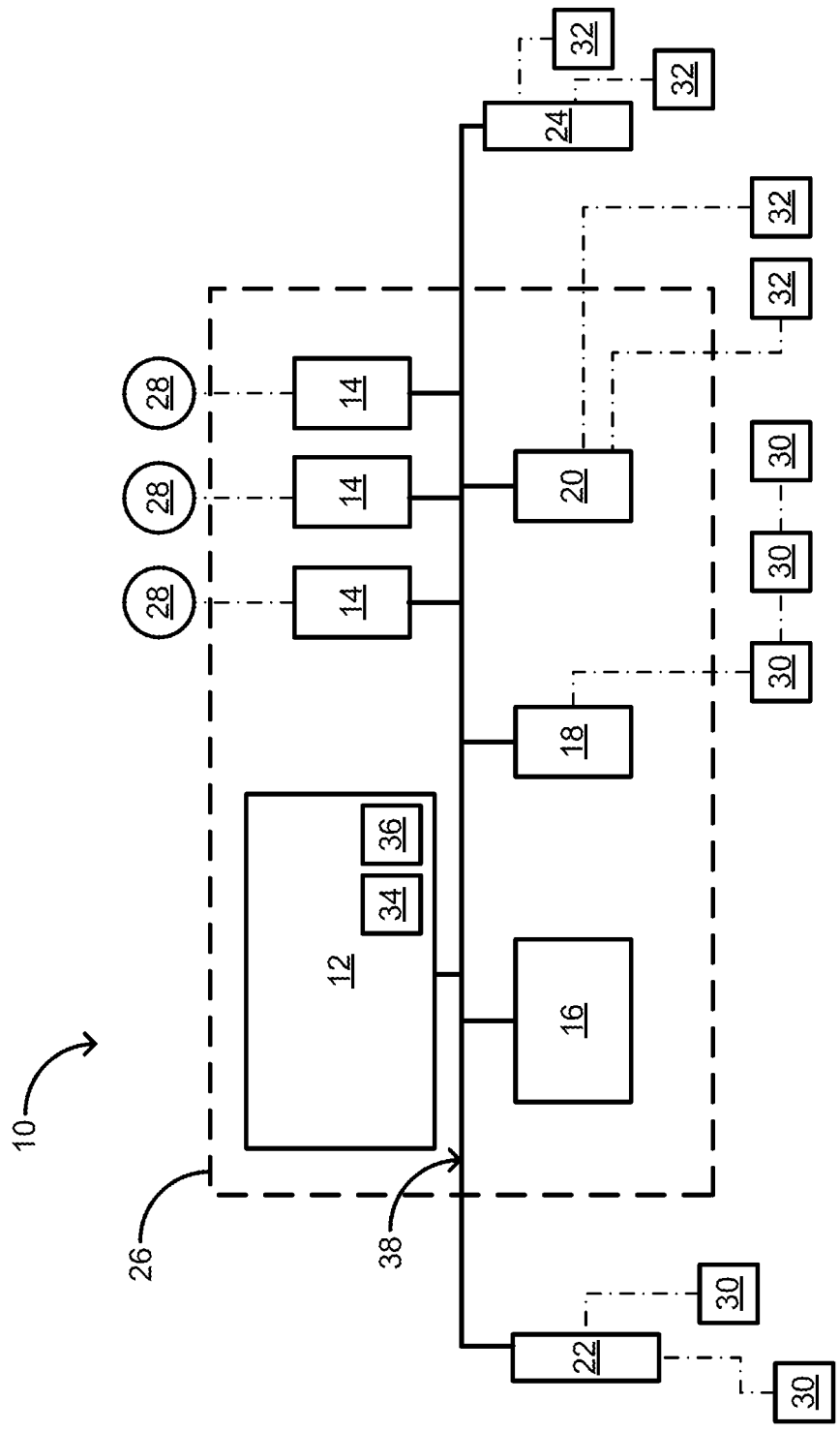
FIG. 1 is a schematic view of an example industrial automation system 10 in which embodiments described herein may be implemented.

Before any embodiments of the invention are explained in detail, it is to be understood that the embodiments are not limited in its application to the details of construction and the arrangement of components set forth in the following description or illustrated in the following drawings. Aspects of the present disclosure are capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. When introducing elements of various embodiments of the present disclosure, the articles "a," "an," "the," and "said" are intended to mean that there are one or more of the elements. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the present disclosure. Various modifications to the illustrated embodiments will be readily apparent to those skilled in the art, and the generic principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the present disclosure. Skilled artisans will recognize the examples provided herein have many useful alternatives and fall within the scope of embodiments of the present disclosure.

FIG. 1 is a schematic view of an example industrial automation system 10 in which embodiments described herein may be implemented. As shown, the system 10 can include a controller 12, one or more drives 14, and a user interface 16, such as a human machine interface (HMI). In some applications, the system 10 can further include one or more safety relays 18, and one or more input/output (I/O) modules 20, 22, 24. Furthermore, the system 10 can include actuators (e.g., motors) 28 and sensors or switches 30, 32. As shown, the controller 12, the drives 14, the user interface 16, the safety relay 18, and one (or more) of the I/O modules 20, as well as various other components of the system 10 not specifically shown or described herein, can be housed within a cabinet 26. The other I/O modules 22, 24, the actuators 28, the sensors 30, 32 and/or other components of the system 10 not specifically shown or described herein, can be located outside the cabinet 26, such as near, on, or within individual machines (not shown) operating in the system 10.

The controller 12 may be programmed (e.g., via computer readable code or instructions stored on memory 34 and configured to be executed by a processor 36) to provide signals to the drives 14 for driving the actuators 28. Generally, the controller 12 may be programmed according to a specific configuration desired for a particular application. For example, the controller 12 may be programmed to respond to external inputs, such as reference signals, alarms, command/status signals, etc. The external inputs may originate from one or more relays or other electronic devices (such as the safety relay 18, the I/O modules 20, 22, 24, or other devices). The controller 12 may also respond to a defined set of operating parameters. The settings of the various operating parameters determine the operating characteristics of the controller 12. For example, various operating parameters may determine the speed or torque of the drive(s) 14 or may determine how the controller 12 responds to the various external inputs. As such, the operating parameters may be used to map control variables within the controller 12 or to control other devices communicatively coupled to the controller 12.

One form of external inputs to the controller 12 can include feedback data from one or more of the sensors 30, 32. More specifically, the sensors 30, 32 can be located outside the cabinet 26, such as on or near machines within the system 10, and can provide information, such as feedback data, to the controller 12 via the safety relay 18 and the I/O modules 20, 22, 24. For example, the controller 12 can be communicatively coupled to the sensors 30, 32 through the safety relay 18 and the I/O modules 20, 22, 24 for detecting conditions such as operating temperatures, voltages, currents, pressures, flow rates, actual motor speed, voltage, frequency, power quality, alarm conditions, proximity, emergency stops, machine positions, hazardous locations, or other parameters within the industrial automation system 10. With feedback data from the sensors 30, 32, the controller 12 can keep detailed track of the various conditions under which the industrial automation system 10 may be operating. Some sensors, such as sensors 30, maybe considered safety sensors while others, such as sensors 32, may be considered standard (e.g., non-safety) sensors. For example, safety sensors may include, but are not limited to, safety interlock switches, safety limit switches, emergency stop devices, absolute encoders, hazardous location switches, and presence sensing safety devices. Standard sensors may include, but are not limited to, inductive proximity sensors, photoelectric sensors, ultrasonic sensors, and light arrays.

The components within the cabinet 26, including the controller 12, the drives 14, the user interface 16, the safety relay 18, and the I/O module 20 may be communicatively coupled via a wired IP subnet. More specifically, as shown in FIG. 1, the components within the cabinet 26 may join the IP subnet by coupling to one or more cables 38 that extend through the cabinet 26. In some embodiments, the cables 38 may use an industrial Ethernet network protocol (EtherNet/IP).

As shown in FIG. 1, however, the sensors 30, 32 of the system 10 are not EtherNet/IP-connected. That is, they do not directly connect to the cables 38 of the IP subnet and are not capable of communicating via IP subnet protocols, such as EtherNet/IP. Rather, they must be integrated into the system 10 via the I/O modules 20, 22, 24 or the safety relay 18. As a result, sensor performance and data access from the sensors 30, 32 to the controller 12 may be limited. Furthermore, as shown in FIG. 1, safety and standard sensors 30, 32 require different integration tools. For example, the I/O module 22 and the safety relay 18 may be required to integrate safety sensors 30 into the system 10, while the I/O modules 20, 24 may be required to integrate standard sensors 32 into the system 10.

Figure 2:
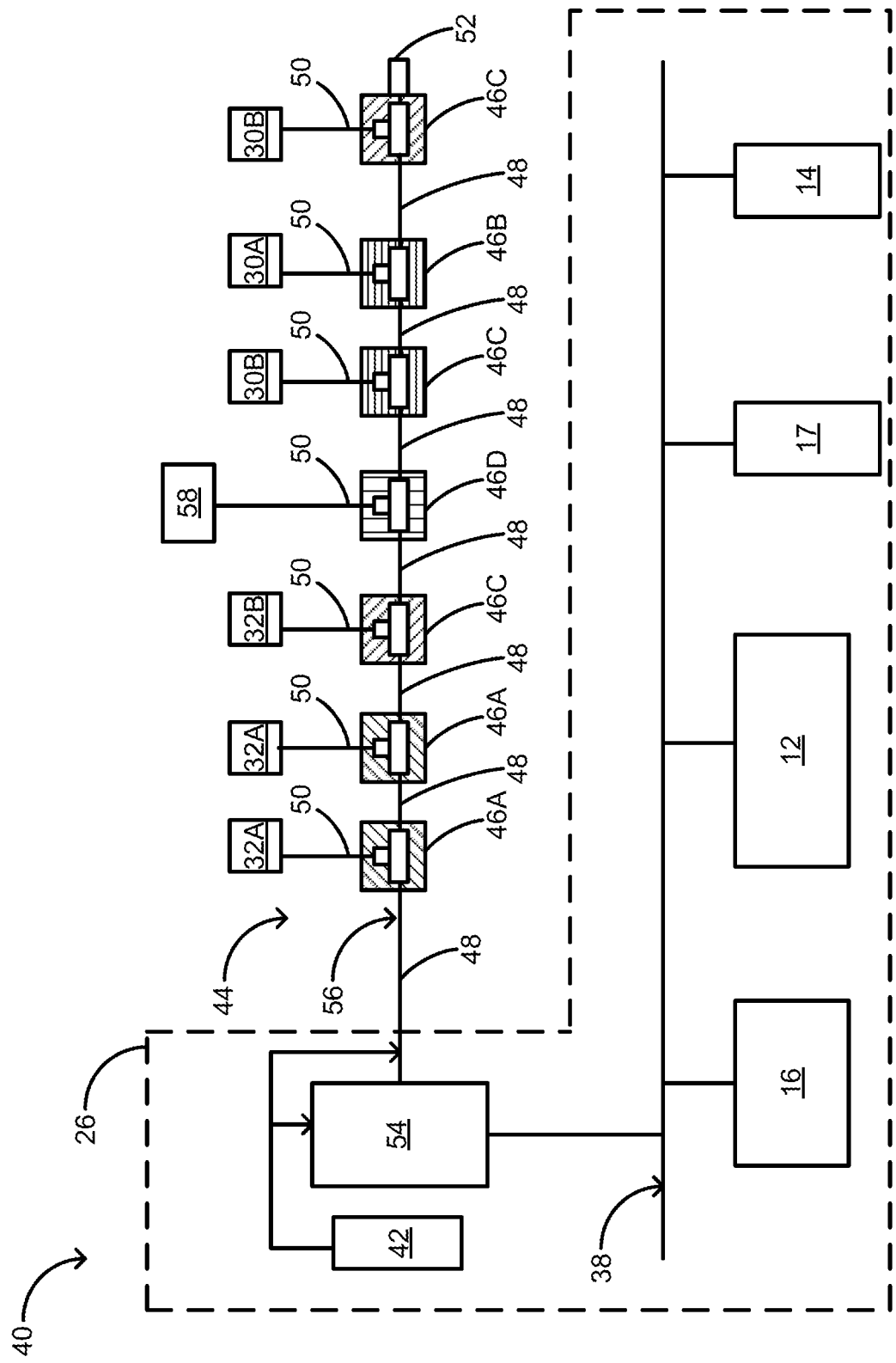
FIG. 2 is a schematic view of another industrial automation system 40, including an industrial single pair Ethernet (SPE) system according to some embodiments.

FIG. 2 illustrates a schematic view of another industrial automation system 40, including an industrial single pair Ethernet (SPE) system 44 according to some embodiments. Like the system 10 of FIG. 1, the system 40 can include a controller 12, one or more drives 14, a user interface 16, as well as other devices 17, stored in a cabinet 26. The system 40 can also include an in-cabinet power supply 42, though, in some embodiments, power may be provided by an external power supply (not shown). As shown in FIG. 2, the components within the cabinet 26 can be part of a full EtherNet/IP network (e.g., part of a wired network or IP subnet) by connecting to Ethernet cable(s) 38 running through the cabinet 26.

Referring still to FIG. 2, according to some embodiments, the SPE system 44 can enable "smart" and/or "non-smart" sensors and other devices to connect to the EtherNet/IP network of the industrial automation system 40, allowing for better control and information integration within the system 40 and removing the need for additional integration devices (such as relays and I/O modules). More specifically, in recent years, SPE technologies have developed enough that standards and chips are available to enable sensors and actuators that are capable of connecting to an Ethernet network. As such, "smart" sensors and actuators may be considered digital devices with such connection capabilities, while "non-smart" devices (also considered "legacy" devices) may be analog devices or digital devices without such connection capabilities. Such smart sensors and actuators with these capabilities may also be referred to as SPE sensors and SPE actuators or, collectively, smart devices or SPE devices. The SPE system 44 of some embodiments addresses the need to better integrate resource-constrained devices into an industrial automation system 40. The SPE system 44 of some embodiments further enables integration of both smart devices as well as non-smart devices, and both safety and standard sensors, all on the same network using a trunk-drop infrastructure, thus providing a simplified network infrastructure and reducing the skill level of labor in building the industrial automation system 40 (e.g., compared to the system 10 of FIG. 1). Furthermore, because the SPE system 44 of some embodiments can incorporate both smart and legacy devices on the same network, the SPE system 44 can serve both Brownfield (e.g., existing) applications and Greenfield (e.g., new) applications.

Figure 10:
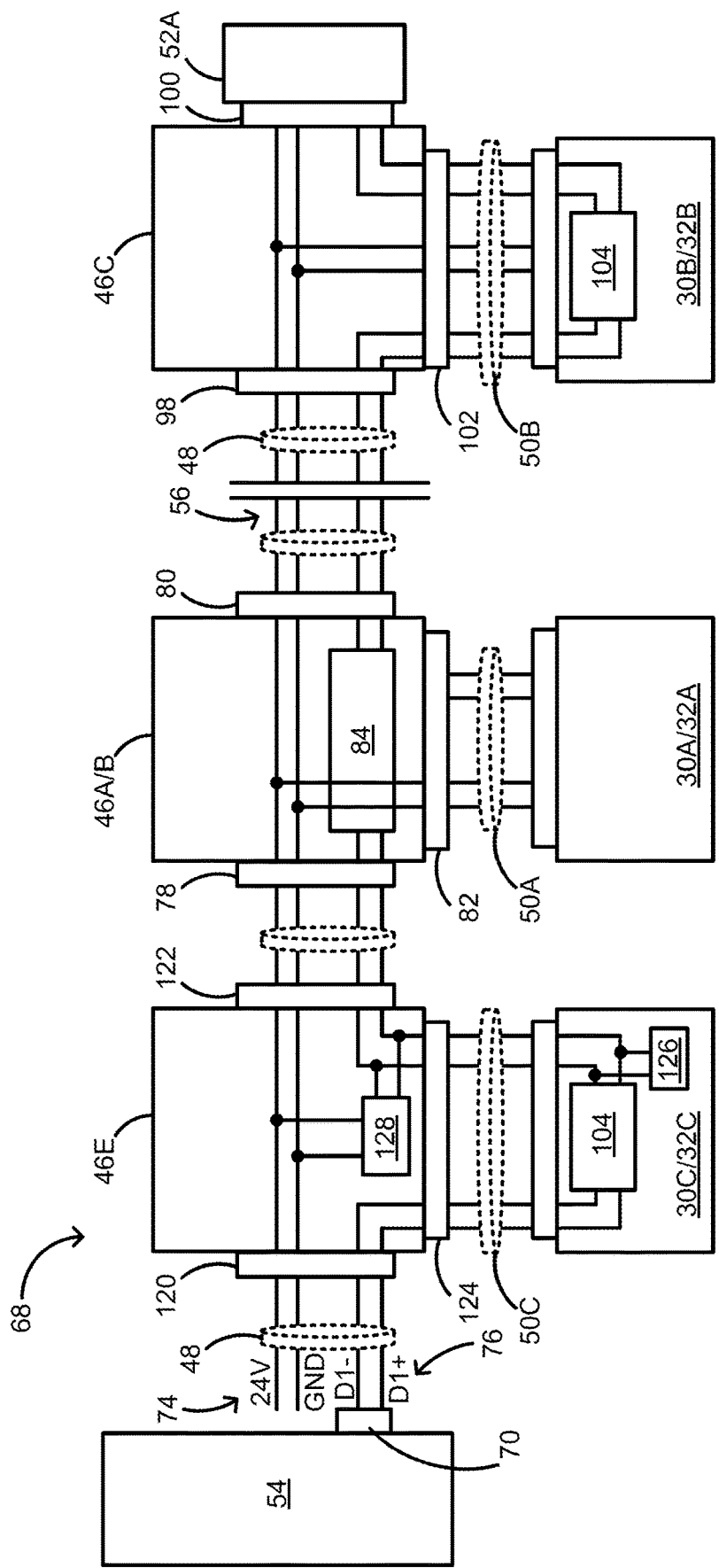
FIG. 10 is another schematic view of the SPE system of FIG. 3 arranged as a linear SPE network, according to some embodiments.
Figure 19:
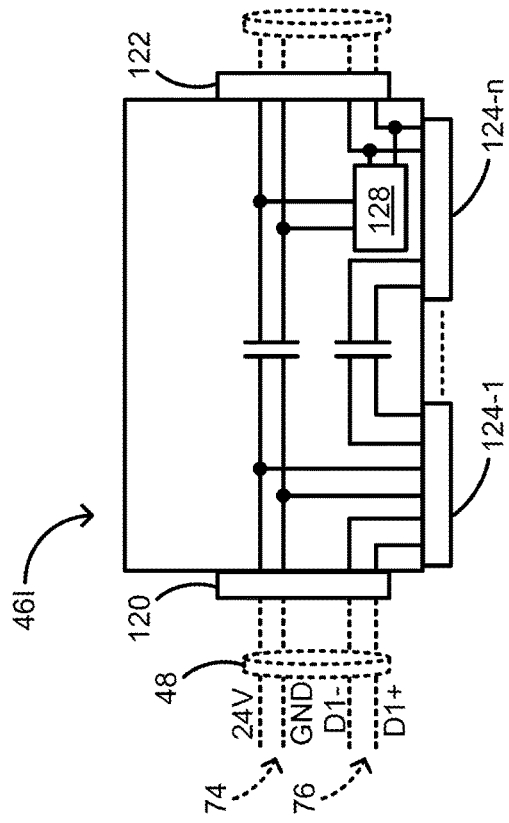
FIG. 19 is a schematic view of a mixed multi-drop tap, according to some embodiments, for use with the SPE system.
Figure 18:
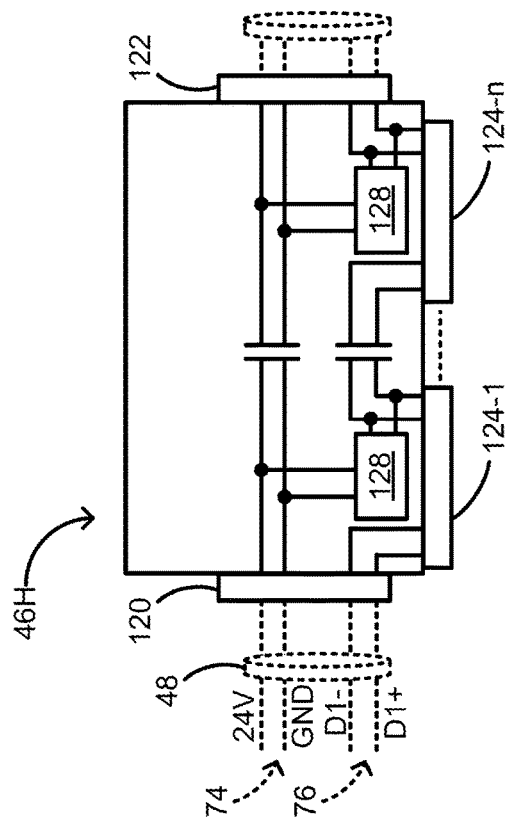
FIG. 18 is a schematic view of a multi-drop powered passive tap, according to some embodiments, for use with the SPE system.

As shown in FIG. 2, the SPE system 44 can include one or more taps 46 (including tap 46A, tap 46B, tap 46C, tap 46D, and/or tap 46E, shown in FIG. 10, tap 46F, shown in FIG. 16, tap 46G, shown in FIG. 17, tap 46H, shown in FIG. 18, and/or tap 46I, shown in FIG. 19), one or more trunk cables 48, one or more drop cables 50, and an end cap 52, as well as one or more safety sensors 30 (including legacy safety sensors 30A and/or smart safety sensors 30B), one or more standard sensors 32 (including legacy standard sensors 32A and/or smart standard sensors 32B), and/or one or more actuators (not shown). These components 30, 32, 46, 48, 50, 52 can be external to the cabinet 26, such as on a machine within the industrial automation system 40. As such, the SPE system 44 can be considered an "on-machine" SPE system 44.

Furthermore, the SPE system 44 can include a linking device 54 to link the SPE system 44 to the EtherNet/IP network in the cabinet 26. That is, as shown in FIG. 2, the linking device 54 can be connected to the cable 38 of the EtherNet/IP network of the industrial automation system 40, and a first one of the trunk cables 48 can be connected to the linking device 54 as well as the in-house power supply 42. In some embodiments, the linking device 54 can be housed in the cabinet 26, as shown in FIG. 2, or can be housed outside the cabinet 26, such as on a machine. As a result, the SPE system 44 can provide both an SPE network and bus power network in a physical trunk-drop network infrastructure (e.g., provided by the trunk cables 48 and the drop cables 50, as further described below). This trunk-drop network infrastructure of the SPE system 44 can simplify the power and communication infrastructure of the industrial automation system 40 and also enables easily adding, removing, or replacing devices within the SPE system 44 without changing configurations of other devices or software.

More specifically, as shown in FIG. 2, the trunk-drop infrastructure of the SPE system 44 comprises the trunk cables 48, the taps 46, and the drop cables 50, and can terminate with the end cap 52. Each of the taps 46 can be a three-way connector with a first port, a second port, and a third port, where the first and second ports ("trunk" ports) are coupled to trunk cables 48 and the third port ("drop" port) is coupled to a drop cable 50. The SPE system 44 can form an IP subnet trunkline 56 (e.g., formed by a series of trunk cables 48) that connects to the linking device 54, with multiple drop lines (e.g., drop cables 50) coming off the trunkline 56, and the SPE system 44 can include multiple devices connected to the trunkline 56 (e.g., to the trunk cables 48), via the drop lines (e.g., via the drop cables 50). In some embodiments, the SPE system 44 may include long trunks 48 between drop lines 50, or may include no drop lines 50 at all, and can allow for new drop lines 50 to be added as needed.

The trunk cables 48 and, thus, the IP subnet trunkline 56, can be configured to facilitate communication via SPE. For example, as further described below with respect to FIGS. 3-19, the trunk cables 48 can include transmission lines with an arrangement of conductors that enable power transmission as well as data transmission via EtherNet/IP. That is, the trunk cables 48 of some embodiments can include a pair of cables for power transmission to provide bus power across the SPE system 44 and at least one SPE cable pair for data communication. A dedicated bus power pair removes the need for complex and expensive power repeaters, which would otherwise limit the number of devices along the IP subnet trunkline 56. Furthermore, the SPE pair enables common industrial protocol (CIP), IP, and SPE connectivity to the last-hop field-constrained device along the IP subnet trunkline 56. Such connectivity can improve user experiences as well as provide better system integration and improved device data analytics (e.g., compared to the non-Ethernet-enabled infrastructure of the system 10 of FIG. 1). That is, in addition to improved control of sensors, switches, and actuators within the industrial automation system 40 (e.g., due to their CIP, IP, SPE connectivity), the devices can provide additional diagnostic and analytics data to the controller 12 and higher level architecture of the system 40 (e.g., due to higher bandwidth capabilities, CIP integration eliminating need for protocol transformation, the switch-based daisy-chain network setup, and ability to provide run-time communications rather than only data after faults). In some embodiments, the IP subnet trunkline 56 may use user datagram protocol (UDP) EtherNet/IP, or another communication protocol.

As noted above, different numbers of devices can be added or removed to the IP subnet trunkline 56 due to its trunk-drop infrastructure. Furthermore, different types of devices may be used in different embodiments of the SPE system 44, and different taps 46 can be used to connect any such device to the IP subnet trunkline 56. More specifically, SPE devices 30B/32B can include circuitry that facilitates power transmission and Ethernet-enabled communication with power and data transmission lines, respectively, of the trunk cables 48, while legacy devices may not. As such, in some embodiments, the SPE system 44 can include smart or SPE standard taps 46A configured to connect to legacy standard devices 32A, SPE safety taps 46B configured to connect to legacy safety devices 30A, and passive taps 46C configured to connect to SPE devices (e.g., standard SPE devices 32B, safety SPE devices 30B, or both standard SPE devices 32B and safety SPE devices 30B). Further details of the internal components of the SPE standard taps 46A and the SPE safety taps 46B are described below with reference to FIGS. 5 and 6, respectively, and it should be noted that any reference made throughout the description to an "SPE tap 46A/B" can be a reference to an SPE standard tap 46A or an SPE safety tap 46B. Alternatively, in some embodiments, SPE standard taps 46A and SPE safety taps 46B may have the same architecture such that they are not separate taps and, thus, may be referred to as SPE taps 46A/B. Additionally, in some embodiments, as shown in FIG. 2, the SPE system 44 can include one or more power taps 46D configured to connect to an on-machine power supply 58.

Generally, as further described below, the SPE taps 46A/B and the SPE devices 30B/32B of some embodiments can each include a dual-port SPE switch, facilitating connection to the SPE cable pair of the IP subnet trunkline and enabling location-based network service functionalities within the industrial automation system 40. Such location-based network service functionalities can include, for example, auto-addressing, diagnostics, identification and verification, etc., and are generally not available using off-network devices or single-port-SPE devices. Accordingly, the SPE system 44 of some embodiments provides taps 46 that enable a single trunk-drop topology as well as SPE and IP protocol for both standard and safety, smart and legacy devices 30, 32. The taps 46 thus decouple traditional integration devices (such as relays, I/O modules, etc.) from the industrial automation system 44 and can enable better fault identification and diagnostics due to the switch-based daisy-chain network design.

Figure 3:
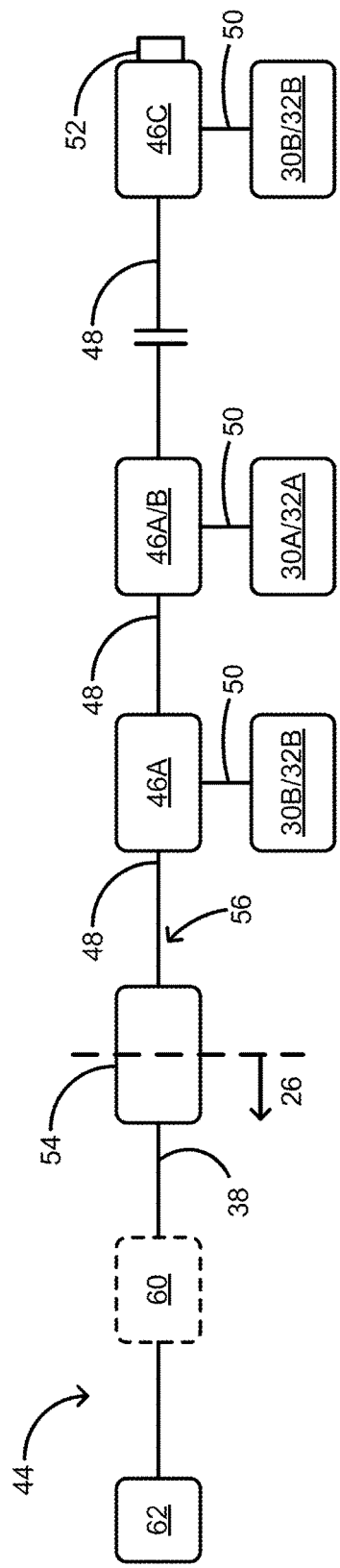
FIG. 3 is a block diagram of an SPE system according to some embodiments.
Figure 12:
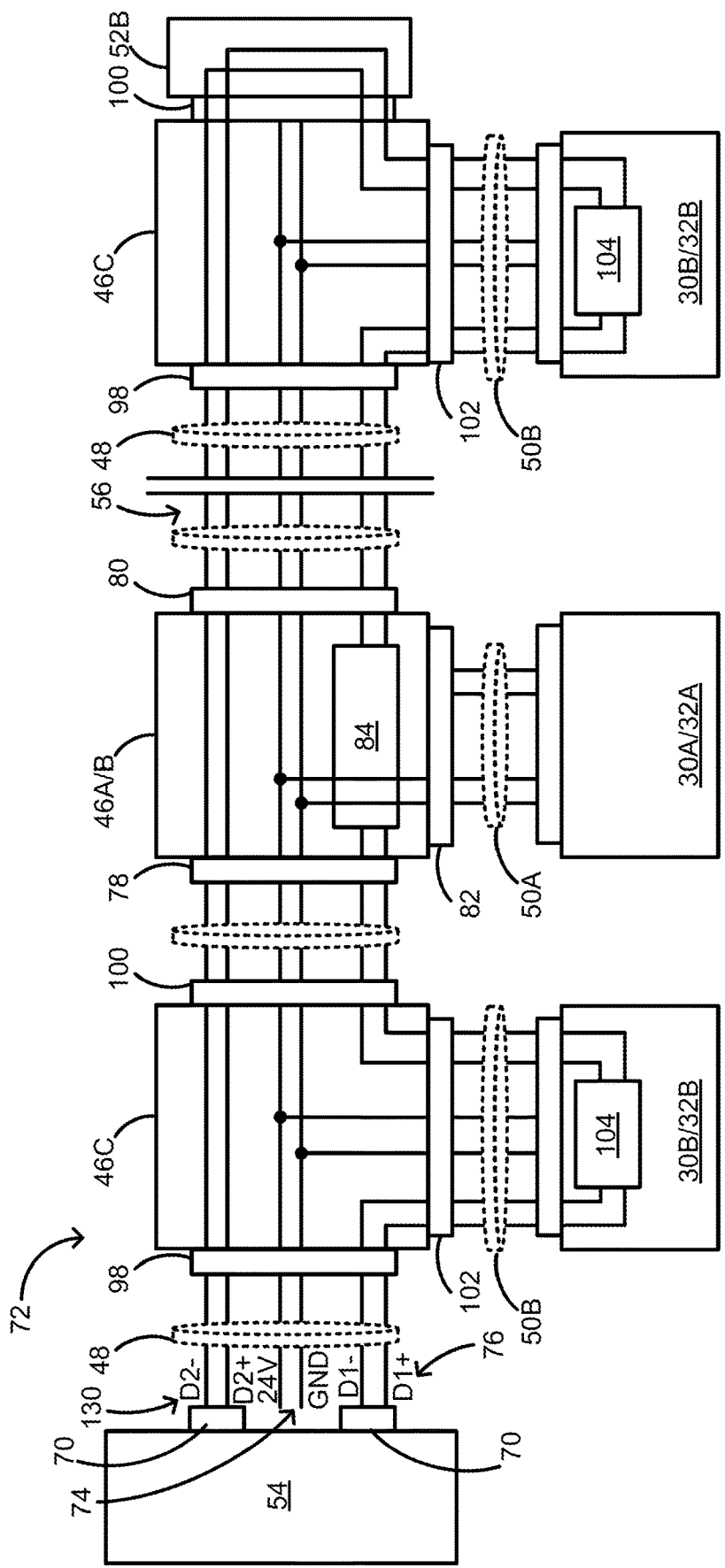
FIG. 12 is a schematic view of the SPE system of FIG. 3 arranged as ring SPE network, according to some embodiments.
Figure 13:
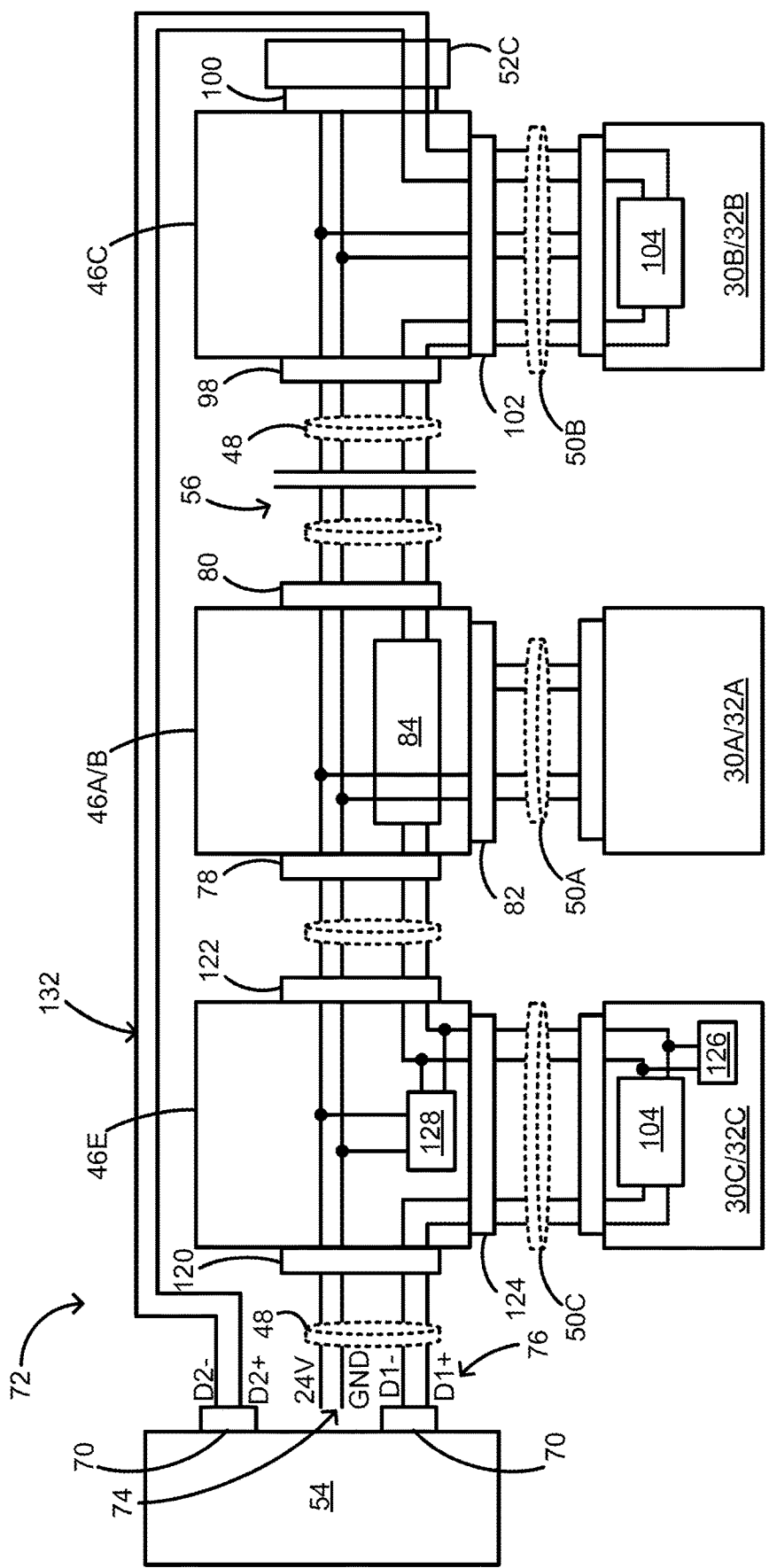
FIG. 13 is another schematic view of a ring SPE network according to some embodiments.
Figure 14:
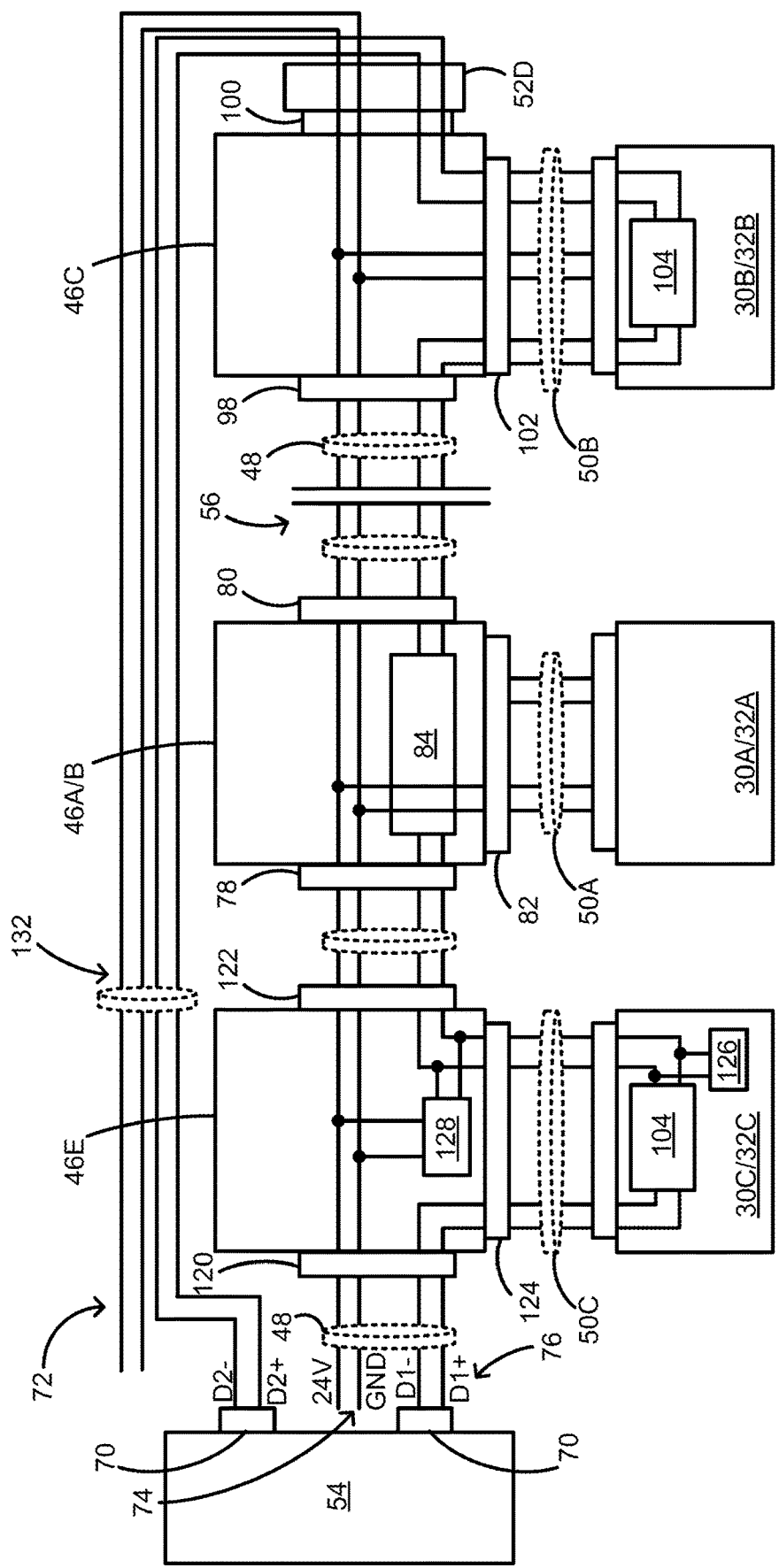
FIG. 14 is yet another schematic view of a ring SPE network according to some embodiments.
Figure 15:
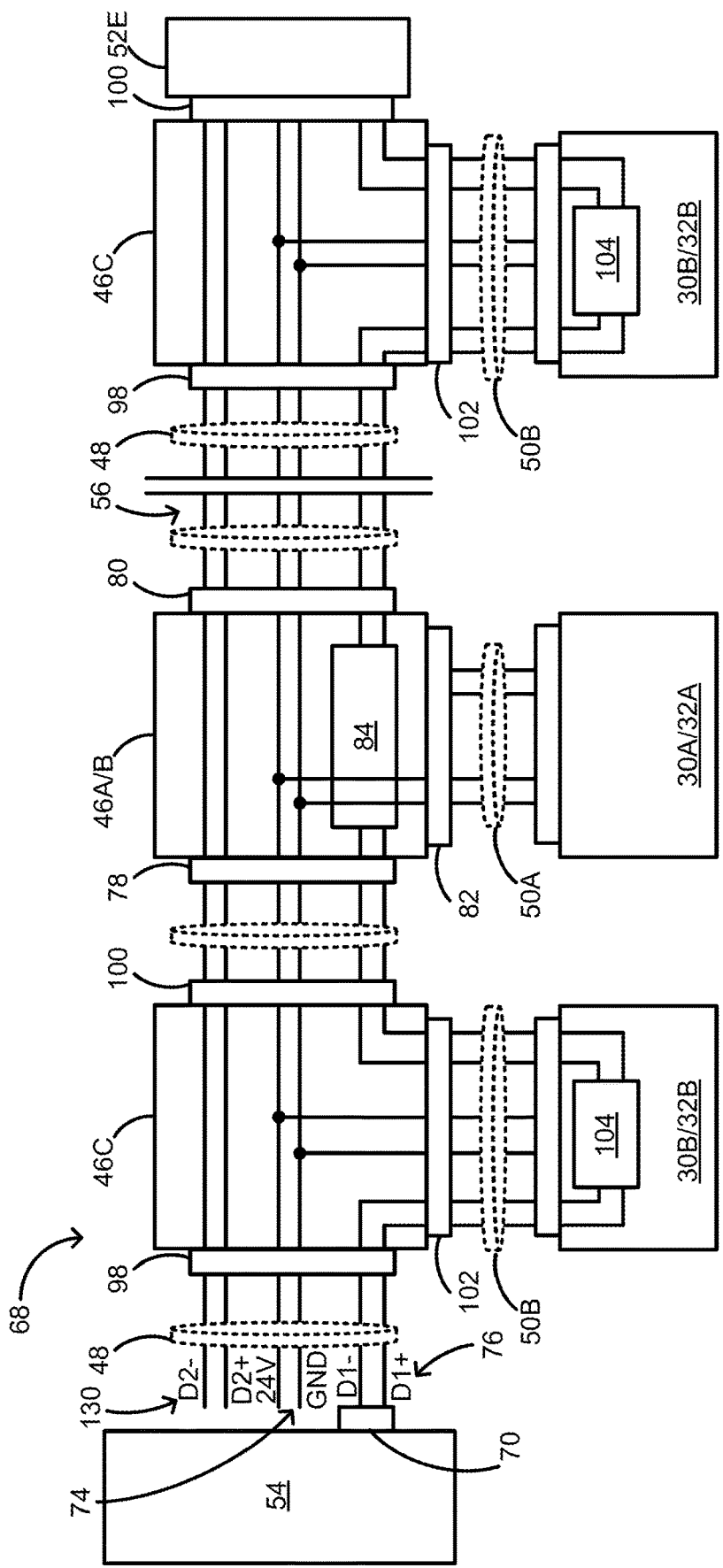
FIG. 15 is yet another schematic view of a linear SPE network according to some embodiments.

Furthermore, the SPE system 44 can include different configurations and arrangements of trunk cables 48, drop cables 50, and taps 46 to enable different SPE network infrastructures. For example, FIG. 3 illustrates a block diagram of an SPE system 44 according to some embodiments. Generally, as shown in FIG. 3, the SPE system 44 can include a linking device 54, which may be connected to an EtherNet/IP switch 60 and a programmable logic controller (PLC) 62 (which may be the same as the controller 12 of FIGS. 1 and 2). The linking device 54 can be connected to SPE devices 30B/32B via passive taps 46C and legacy devices 30A/32A via SPE taps 46A/B. Furthermore, an end cap 52 can be placed after the last device 30/32 to terminate the system 44. The SPE system 44 of FIG. 3 can be configured as a linear SPE network infrastructure 68, coupled to a single SPE port 70 of the linking device 54, as shown in FIGS. 4, 10, and 15, or a ring SPE network infrastructure 72, coupled to dual SPE ports 70 of the linking device 54, as shown in FIGS. 12, 13, and 14.

Figure 4:
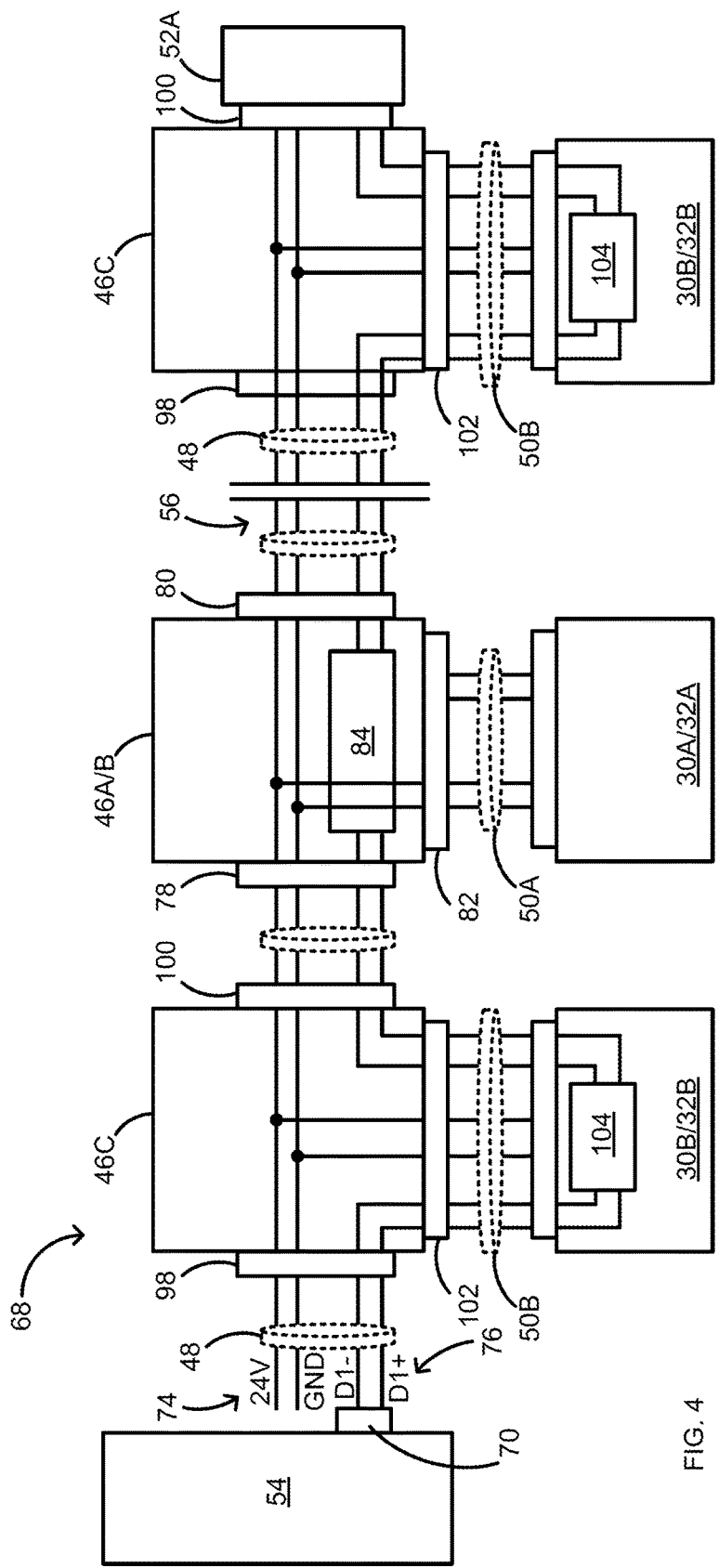
FIG. 4 is a schematic view of the SPE system of FIG. 3 arranged as a linear SPE network, according to some embodiments.

More specifically, a linear SPE network infrastructure 68, as shown in FIGS. 4 and 10, may include a linear IP subnet trunkline 56 extending from the linking device 54 to a last hop device 30/32, with an end cap 52 and, more specifically, a terminator 52A, positioned at the last hop device 30/32. The trunk cables 48 and drop cables 50 may be configured to accommodate at least power transmission, as well as communication to and from the single SPE port 70. A ring network infrastructure 72, as shown in FIG. 12, may include a ring IP subnet trunkline 56 that extends from the linking device 54 to the last hop device 30/32 and loops back around from the last hop device 30/32 to return to the linking device 54 using an end cap 52 in the form of a splicer 52B. The trunk cables 48 and drop cables 50 may be configured to accommodate at least power transmission, as well as communication to and from the two SPE ports 70. FIGS. 13, 14, and 15 illustrate a linear SPE network 68 converted into a ring SPE network 72 and a ring SPE network 72 converted into a linear SPE network 68, respectively.

Accordingly, FIG. 4 is a schematic view of the SPE system 44 of FIG. 3 arranged as linear SPE network 68, according to some embodiments. As shown in FIG. 4, the linking device 54 can be a single-port SPE linking device, thus having an SPE port 70. In some embodiments, the linking device 54 can include a media converter between SPE and multiple pair ethernet (MPE, such as standard four-cable pair ethernet), a sensor network manager (e.g., to perform topology discovery, device addressing, sensor network redundancy protocol, device replacement, etc.), a CIP router between the full EtherNet/IP network in the cabinet 26 and the UDP-only EtherNet/IP of the SPE system 44 (e.g., to integrate the two EtherNet/IP transport profiles seamlessly, including transport layer security (TLS)/data transport layer security (DTLS) and cipher suite transformation), an I/O connection aggregator (e.g., to reduce the number of I/O connections of the controller 12 of the industrial automation system 44, though safety I/O connections may not be aggregated in some embodiments), and a security proxy (e.g., to provide user access authorization on behalf of the network devices). Furthermore, the linking device 54 can recognize SPE devices (including taps 46, sensors 30, 32, or actuators) and their location using linear network characteristics, can provide location-based network services (including device addressing, identification, verification, and diagnostics), and, in some embodiments, can provide a redundant network service (e.g., via a ring management protocol).

Furthermore, referring still to FIG. 4, the trunk cable 48 can be a hybrid four-wire cable including a power cable pair (e.g., power and ground cables) and an SPE cable pair. More specifically, the trunk cable 48 can include a power cable pair 74 (such as a 24-volt line and a ground line), which may connect to an in-cabinet power supply 42, as shown in FIG. 2, to provide power transmission across the network 68. The trunk cable 48 can further include an SPE cable pair 76 (e.g., a linear SPE cable pair, denoted as D1+ and D1−), which connect to the SPE port 70 of the linking device 54. For example, the power cable pair 74 may carry Direct Current (DC) power, while the SPE cable pair 76 may transmit communication signals (e.g., via EtherNet/IP).

Referring still to FIG. 4, the SPE tap 46A/B, which can connect to a legacy device 30A/32A, can include a first port 78, a second port 80, and a third port 82. The first and second ports 78, 80 can each connect to the power cable pair 74 and the SPE cable pair 76 of the trunk cables 48. Therefore, the first port 78 and the second port 80 can each include four pins (e.g., two pins for power bus connections and two pins for SPE connections). The third port 82 can connect to a drop cable 50A configured to connect to the legacy device 30A/32A. For example, the drop cable 50A can be a four-wire sensor cable including a pair of power wires and input/output wires and the third port 82 can include four pins to interface with the drop cable 50A (e.g., two pins for power bus connections and two pins for sensor interface connections). Thus, internally, the power cable pair 74 can extend across the SPE tap 46A/B between the first and second ports 78, 80, with connections branching off to the third port 82, e.g., to connect bus power to the power pair of the drop cable 50A. The SPE cable pair 76 can connect from the first port 78 to the second port 80 via an internal dual-port SPE switch 84.

Figure 6:
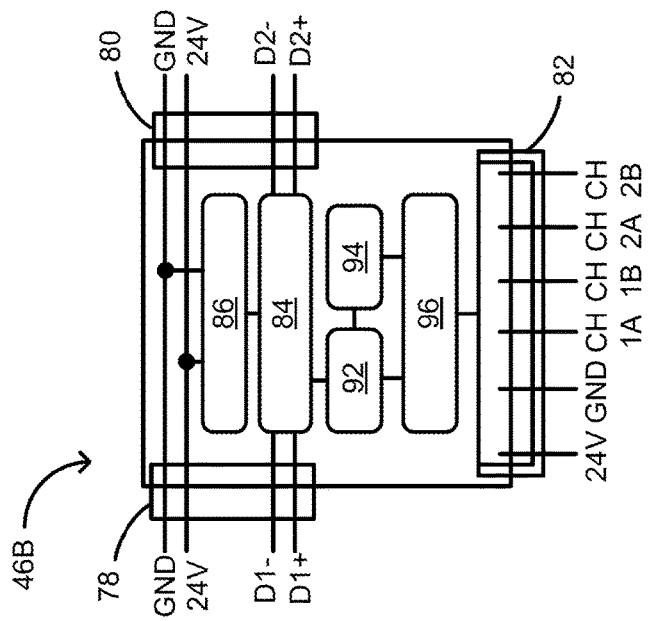
FIG. 6 is a schematic view illustrating further detail of an SPE safety tap, according to some embodiments, for use with the SPE system.
Figure 5:
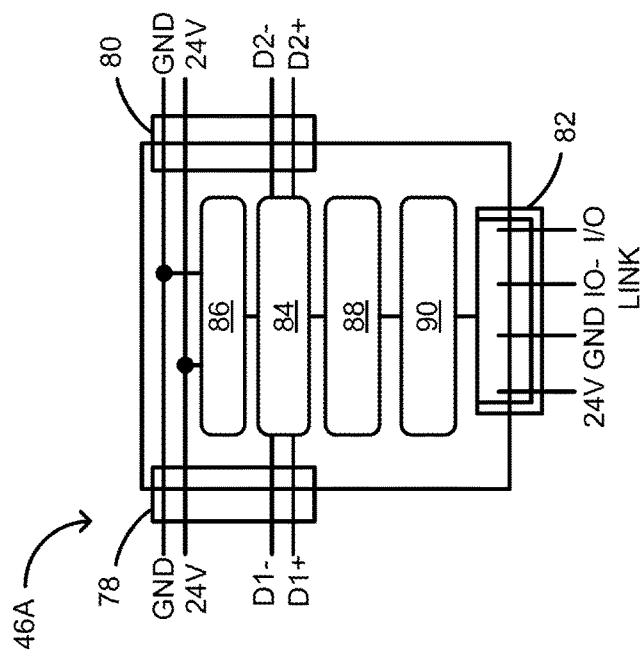
FIG. 5 is a schematic view illustrating further detail of an SPE standard tap, according to some embodiments, for use with the SPE system.

Accordingly, the SPE tap 46A/B can include a dedicated SPE switch 84 to integrate legacy devices 30A/32A into the SPE system 44 through the trunk-drop infrastructure. For example, FIG. 5 is a schematic view illustrating further detail of an SPE standard tap 46A, according to some embodiments, for use with the SPE system 44. And FIG. 6 is a schematic view illustrating further detail of an SPE safety tap 46B, according to some embodiments, for use with the SPE system 44. As shown in FIG. 5, the SPE standard tap 46A can include a first port 78, a second port 80, and a third port 82, as described above. Internally, the SPE standard tap 46A can include a power management module 86 (e.g., coupled to the power cable pair 74), the SPE switch 84 (e.g., a dual-port SPE and physical network (PHY) switch, coupled to the SPE cable pair 76), a microcontroller unit (MCU) 88, and a sensor interface 90. The sensor interface 90 can provide connections, through the third port 82 (and, more specifically, through pins of the third port 82), to a legacy standard sensor 32A including, for example, power connections (24-volt, ground) and sensor data connections (e.g., IO-Link, I/O). In some embodiments, the sensor interface 90 can include an IO-Link interface as shown in FIG. 5, or a discrete sensor (or actuator) interface (not shown).

As shown in FIG. 6, the SPE safety tap 46B can include a first port 78, a second port 80, and a third port 82, as described above. Internally, the SPE safety tap 46B can include a power management module 86 (e.g., coupled to the power cable pair 74), the SPE switch 84 (e.g., a dual-port SPE and physical network (PHY) switch, coupled to the SPE cable pair 76), a first MCU 92, a second MCU 94, and safety input circuitry 96. The safety input circuitry 96 can provide connections, through the third port 82 (and, more specifically, through pins of the third port 82), to a legacy safety sensor 30A including, for example, power connections (24-volt, ground) and safety sensor data connections (e.g., Channel 1A, Channel 1B, Channel 2A, Channel 2B).

Referring back to FIG. 4, the passive tap 46C, which can connect to an SPE device 30B/32B, can include a first port 98, a second port 100, and a third port 102. The first and second ports 98, 100 can each connect to the power cable pair 74 and the SPE cable pair 76 of the trunk cables 48. Therefore, the first port 98 and the second port 100 can each include four pins (e.g., two pins for power bus connections and two pins for SPE connections). The third port 102 can connect to a drop cable 50B configured to connect to the SPE device 30B/32B. More specifically, the SPE device 30B/32B can be a dual-port SPE device, including a dual port SPE switch 104, and the drop cable 50B can be a hybrid six-wire cable including a pair of power cables to transmit power from the trunk 48, a first pair of SPE cables for uplink SPE between the trunk 48 and the SPE switch 104 and a second pair of SPE cables for downlink SPE between the trunk 48 and the SPE switch 104. As such, the third port 102 can include six pins (e.g., two pins for power bus connections, two pins for uplink SPE connections, and two pins for downlink SPE connections). Thus, internally, the power cable pair 74 can extend through the passive tap 46C between the first and second ports 98, 100, with connections branching off to the third port 102, e.g., to connect the power cable pair 74 to the drop cable 50B. The SPE cable pair 76 can connect from the first port 98 to the third port 102, e.g., to connect to the uplink SPE pair of the drop cable 50B, and back from the third port 102 to the second port 100, e.g., to connect to the downlink SPE pair of the drop cable 50B.

Accordingly, the passive tap 46C acts as a pass-through for power and data communication lines to the SPE device 30B/32B through the trunk-drop infrastructure, as the SPE device 30B/32 includes its own dedicated SPE switch 104. For example, FIG. 7 is a schematic view illustrating further detail of an SPE safety sensor 30B, according to some embodiments, for use with the SPE system 44. FIG. 8 is a schematic view illustrating further detail of another SPE safety sensor 30B, according to some embodiments, for use with the SPE system 44. And FIG. 9 is a schematic view illustrating further detail of an SPE standard sensor 32B, according to some embodiments, for use with the SPE system 44.

As shown in FIGS. 7, 8, and 9, the SPE sensors 30B, 32B can each include a port 106 configured to be communicatively coupled to the third port 102 of the passive tap 46C via the drop cable 50B. In some embodiments, as shown in FIGS. 7 and 9, the port 106 can include six pins to accommodate an uplink SPE pair (D1+, D1−), a power cable pair (24-volt, ground), and a downlink SPE pair (D2+, D2−). In other embodiments, as shown in FIG. 8, the port 106 can include four pins to accommodate an uplink SPE pair (D1+, D1−) and a powered downlink SPE pair (24-volt/D2+, ground/D2−), and the SPE sensor 30B, 32B can include an internal power decoupler 126 connected to the powered downlink SPE pair (as described in more detail below). The SPE pairs can connect to the internal SPE switch 104 (e.g., a dual-port SPE and physical network (PHY) switch). The SPE sensors 30B, 32B can further each include a power management module 108 and the safety SPE sensor 30B can include a first microcontroller unit (MCU) 110, a second MCU 112, and a safety application 114, as shown in FIG. 7, or a first MCU 110, a second MCU 112, a third MCU 113, and a safety application 114, as shown in FIG. 8. In some embodiments, the safety SPE sensor 30B may also include additional MCUs, such as more than three MCUs. The standard SPE sensor 32B can include an MCU 116 and an application 118, as shown in FIG. 9. It should be noted that the four-pin port 106 and power decoupler 126 shown in FIG. 8 can alternatively be incorporated into the safety SPE sensor 30B of FIG. 7 or the standard SPE sensor of FIG. 9, and the six-pin port 106 shown in FIGS. 7 and 9 can alternatively be incorporated into the safety SPE sensor 30B of FIG. 8. Generally, the power decoupler 126 be used, in conjunction with a respective tap 46, to enable power delivery through the SPE lines of a drop cable 50.

More specifically, in some embodiments, the SPE system 44 may also be configured to be coupled to SPE devices 30B/32B that are internally powered. For example, FIG. 10 is another schematic view of the SPE system 44 of FIG. 3 arranged as a linear SPE network 68, according to some embodiments. As shown in FIG. 10, the linear SPE network 68 can include the passive tap 46C and the SPE tap 46A/B described above with respect to FIG. 4, as well as a powered passive tap 46E to connect to a powered SPE device 30C/32C. The powered passive tap 46E can include a first port 120, a second port 122, and a third port 124. The first and second ports 120, 122 can connect to the power cable pair 74 and the SPE cable pair 76 of the trunk cables 48. Therefore, the first port 120 and the second port 122 can each include four pins (e.g., two pins for power bus connections and two pins for SPE connections). The third port 124 can connect to a drop cable 50C configured to connect to the powered SPE device 30C/32C. More specifically, the powered SPE device 30C/32C can be a powered dual-port SPE device with an internal power decoupler 126, and the drop cable 50C can be a four-wire cable including a first pair of SPE cables for uplink SPE to the trunk 48 and a second pair of SPE cables for powered downlink SPE to the trunk 48.

As shown in FIG. 10, internally, the power cable pair 74 can extend through the powered passive tap 46E between the first and second ports 120, 122, with connections branching off to an internal power coupler 128. The SPE cable pair 76 can connect from the first port 120 to the third port 124, e.g., to connect to the uplink SPE pair of the drop cable 50C. The SPE cable pair 76 can further connect from the third port 124 to the second port 122, e.g., to connect to the powered downlink SPE pair of the drop cable 50C, and the power decoupler 126 within the powered SPE device 30C/32C and the power coupler 128 within the passive tap 46E can also internally connect to this powered downlink SPE line. As such, the passive tap 46E can couple power from the power cable pair 74 to the downlink SPE pair, and the powered SPE device 30C/32C decouples the power from the SPE pair. For example, the power coupler 128 can isolate common mode noise from the power cable pair 174 and isolate an SPE signal from the SPE cable pair 76. Thus, the power decoupler 126 and power coupler 128 only need to pass current for one dedicated device 30C/32C, which enables the use of small, low-cost coupler circuitry. Additionally, as shown in FIG. 10, the third port 124 can include four pins to interface with the four-wire drop cable 50C (e.g., two pins for uplink SPE connections and two pins for power and downlink SPE connections). Accordingly, two adjacent powered SPE devices 30C/32C can communicate over the SPE cable pair 76, via the uplink and downlink SPE connections, and also receive power from the power cable pair 74 via the downlink SPE connection.

Figure 11:
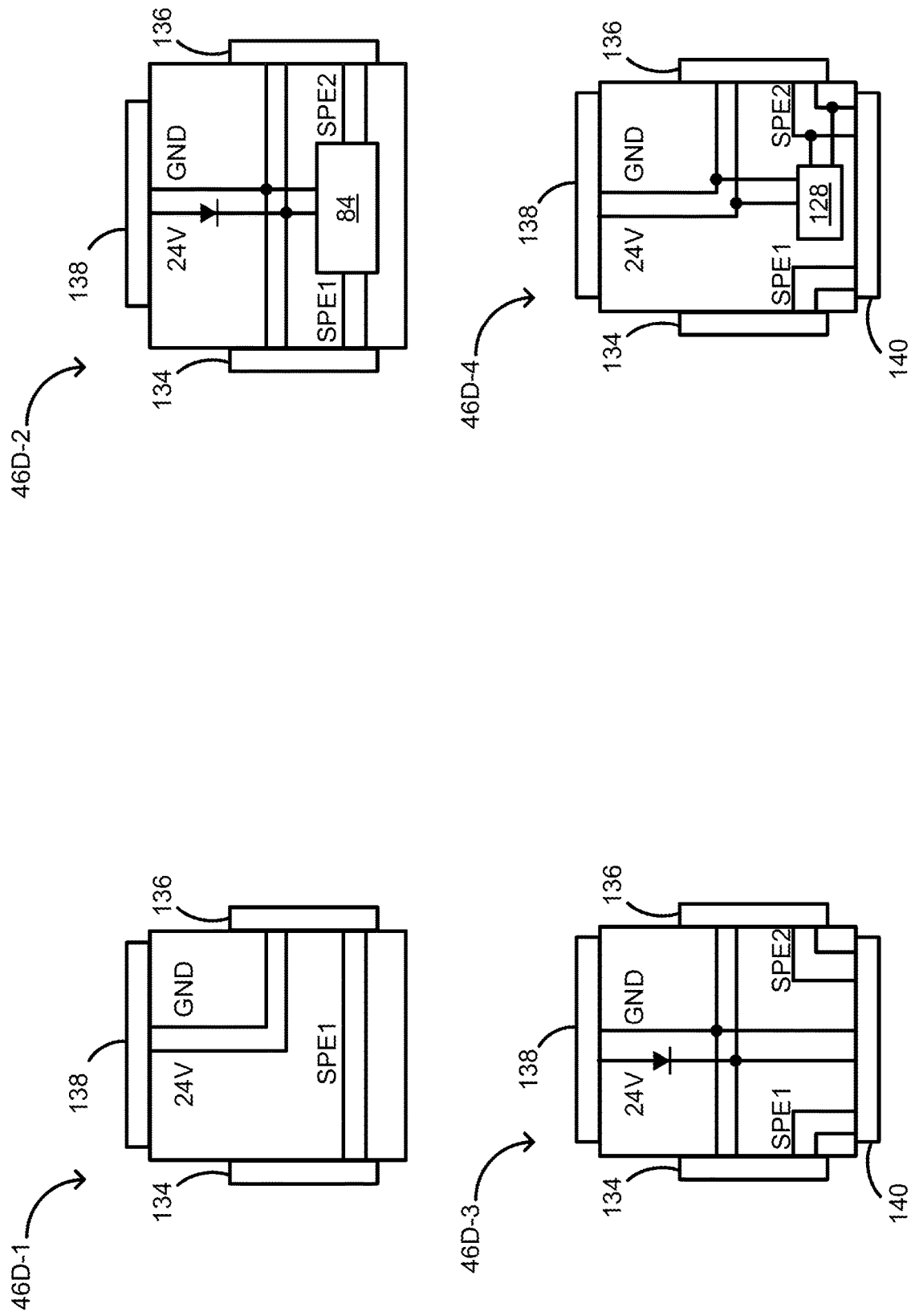
FIG. 11 is a schematic view of power taps, according to some embodiments, for use with the SPE system.

Additionally, though not shown in FIGS. 4 and 10, in some embodiments, the linear SPE network 68 may also include one or more power taps 46D configured to connect to an external power supply, such as an on-machine power supply 58 (as shown in FIG. 2). For example, a power tap 46D can provide power when a first power supply cannot meet power requirements of the network 68. FIG. 11 illustrates example power taps 46D-1, 46D-2, 46D-3, 46D-4 according to some embodiments. Each power tap 46D-1, 46D-2, 46D-3, 46D-4 can include a first port (e.g., a first trunk port) 134, a second port (e.g., a second trunk port) 136, and a third port (e.g., a power port) 138. The first port 134 can connect to the SPE cable pair 76 of the trunk cables 48, the second port 136 can connect to the power cable pair 74 and the SPE cable pair 76 of the trunk cables 48, and the third port 138 can connect to a drop cable 50 configured to connect to a power supply 58.

As shown in FIG. 11, internally, an SPE cable pair 76 can connect from the first port 134 to the second port 136, e.g., via a direct connection (as in power tap 46D-1), through an SPE switch 84 (as in power tap 46D-2), or through a fourth port 140 and connected device 30B/32B, 30C/32C (as in power taps 46D-3, 46D-4, respectively). That is, the fourth port 140 of power tap 46D-3 can be similar to the third port 102 of the passive tap 46C and the fourth port 140 of power tap 46D-4 can be similar to the third port 124 of the powered passive tap 46E, as shown in FIG. 10 and described above. Furthermore, the third port 138 can connect to a power pair (e.g., 24 volts and ground) from a connected power source 58, and further connect the power pair to the second port 136 to be connected to the power cable pair 74 of a trunk cable 48 (as in power tap 46D-1), to the second port 136 and an SPE switch 84 (as in power tap 46D-2), to the second port 136 and the fourth port 140 (as in power tap 46D-3), or to the second port 136 and a power coupler 128 (as in power tap 46D-4).

Additionally, the power tap 46D can support a separated power zone, as shown in the example power taps 46D-1 and 46D-4, or a continuous power zone via a diode on the power line, as shown in the example power taps 46D-2 and 46D-3. Generally, a separated power zone means that the power pair from the connected power source 58 is only connected to a downlink power cable pair 74 of a trunk cable 48 (and additional connections discussed above specific to the corresponding power tap 46D-2, 46D-3, 46D-4). As a result, the power tap 46D only powers devices connected to its downlink port 136 (e.g., devices within its power "zone"). In this manner, the linear SPE network 68 can include separate power zones, each powered by different power sources. On the other hand, a continuous power zone means that the power pair from the connected power source 58 is connected to both the downlink power cable pair 74 of a trunk cable 48 as well as the uplink power cable pair 74 of a trunk cable 48. In this manner, power taps 46D supporting a continuous power zone can provide power to both uplink and downlink devices. Thus, the linear SPE network 68 includes one continuous power zone, rather than separate power zones, as described above. For example, if an uplink device has no power source, the power tap 46D can provide power to the uplink device. If the uplink device has another power source (i.e., an uplink power source) with a higher voltage than that of the power source 58 connected to the power tap 46D, the diode within the power tap 46D helps isolate the power supply of the power tap 46D so that downlink devices can still be powered by the uplink power source. It should be noted that any of the power taps 46D-1, 46D-2, 46D-3, 46D-4 can support a separated or continuous power zone via the deletion or addition of the diode and additional power pair connection to the uplink port 134.

Finally, referring back to the linear SPE networks 68 of FIGS. 4 and 10, to terminate the linear SPE network 68, the terminator 52A can be connected to the second port 80/100/122 of the tap 46 of the last device 30/32. While a passive tap 46C is illustrated in FIGS. 4 and 10 as the last tap 46 on the network 68, in some applications, the last tap 46 may instead be an SPE tap 46A/B or a powered passive tap 46E. Alternatively, in some embodiments, the terminator 52A may be configured to be connected to a trunk cable 48 that extends from the second port 80/100/122 of the tap 46 of the last device 30/32. As a result, if a further device 30/32 is to be added to the industrial automation system 40, a new tap 46 can replace the terminator 52A along the trunk cable 48, and the terminator 52A can be coupled to the second port 80/100/122 of the new tap 46.

Referring now to a ring network structure of the SPE system 44, FIG. 12 is a schematic view of the SPE system 44 of FIG. 3 arranged as ring SPE network 72, according to some embodiments. As noted above, the ring SPE network 72 can be similar to the linear SPE network 68 of FIGS. 4 and 10 and can include a linking device 54 connected to SPE devices 30B/32B via passive taps 46C and to legacy devices 30A/32A via SPE taps 46A/B. Furthermore, a splicer 52B can be placed after the last device 30/32, e.g., rather than the terminator 52A of the linear SPE network 68, in order to create the ring network structure.

More specifically, as shown in FIG. 12, the linking device 54 can be a dual-port SPE linking device 54, thus having two SPE ports 70, and a ring management protocol. Furthermore, the trunk cable 48 can be a hybrid six-wire cable including a power cable pair (e.g., power and ground cables) and two SPE pairs. That is, the trunk cable 48 can include a power cable pair 74 (such as a 24-volt line and a ground line), which may connect to an in-cabinet power supply 42, as shown in FIG. 2, to provide power transmission across the network 72. The trunk cable 48 can further include two SPE cable pairs, e.g., a first, or linear, SPE cable pair 76, denoted as D1+ and D1−, and a second, or loopback, SPE cable pair 130, denoted as D2+ and D2−, which connect to the two SPE ports 70, respectively, of the linking device 54. For example, the power cable pair 74 may carry Direct Current (DC) power, while the SPE cable pairs 76, 130 may transmit communication signals (e.g., via EtherNet/IP).

Furthermore, as shown in FIG. 12, the taps 46 can include similar port connections as in the linear SPE network 68 described above. For example, the third port 82, 102 of each tap 46C, 46A/B (as well as the third port 124 of a powered passive tap 46E, not shown) can be the same as described above with respect to FIGS. 4 and 10 (e.g., have the same pin connections). The first ports 78, 98 and second ports 80, 100 of each tap 46C, 46A/B (and first and second ports 120, 122 of a powered passive tap 46E, not shown) can connect the power cable pairs 74 as well as both SPE cable pairs 76, 130 of the trunk cables 48. More specifically, the first ports 78, 98, 120 and the second ports 80, 100, 122 of each tap 46C, 46A/B, 46E (e.g., the trunk ports) can connect the power cable pairs 74 and the first SPE cable pairs 76 of the trunk cables 48 to provide power transmission to and data communication with the respective sensor 30/32 through the third ports 82, 102, 124 (e.g., the drop ports), as described above with respect to FIG. 4. The first ports 78, 98, 120 and the second ports 80, 100, 122 of each tap 46C, 46A/B, 46E can further connect the second SPE cable pair 130 of the trunk cables 48 so that the second SPE cable pair 130 can pass through the tap 46 between the first ports 78, 98, 120 and the second ports 80, 100, 122. Therefore, the first ports 78, 98, 120 and the second port 80, 100, 122 within a ring SPE network 72 can each include six pins (e.g., two pins for power bus connections, two pins for linear SPE connections, and two pins for loopback SPE connections). Finally, as shown in FIG. 12, the splicer 52B can be connected to the second port 80/100/122 of the tap 46 of the last device 30/32 and can connect the two pairs of SPE lines 76, 130, thus forming a ring where the second SPE pair 130 loops back to the linking device 54.

In some embodiments, a splicer 52B can also be used as a placeholder on a drop line 50 within the linear or ring SPE network 68, 72. More specifically, the splicer 52B can be coupled to a third port 82/102/124 of a tap 46, thus acting as a pass-through for the SPE cable pair 76 and reserving a space for a sensor 30/32 to be connected to the tap 46 at a later time. In some embodiments, the splicer 52B can include capacitors to isolate the power (e.g., the DC voltage) on the powered SPE pair (e.g., the downlink SPE pair) of a powered passive tap 46E. Additionally, in some embodiments, though not shown in FIGS. 4, 10, and 12, one or more of the sensors 30/32 may be replaced with other devices (e.g., legacy or smart devices), such as actuators. Furthermore, while the description herein refers to "sensors" 30/32, it should be noted that this term may comprise sensors, switches, any of the specific examples provided for safety and standard sensors described above, or safety and/or standard sensor examples not specifically described herein.

It should be noted that, in some embodiments, a linear SPE network 68 can be converted to a ring SPE network 72 and vice versa. For example, FIG. 13 is another schematic view of a ring SPE network 72 according to some embodiments. The ring SPE network 72 of FIG. 13 can be similar to the linear SPE network 68 of FIGS. 4 and 10, including the hybrid four-wire trunk cable 48 coupled to the first SPE port 70 of the linking device 54. However, a separate SPE pair cable 132 can be routed from the last tap 46 back to the second SPE port 70 of a dual-port linking device 54, forming the ring SPE network 72. Thus, a dedicated end cap 52C may be positioned at the second port 80/100/122 of the last tap 46 to terminate the power cable pair 74 while providing a pass-through for the SPE cable pair 76 to connect to the additional SPE cable 132.

As another example, FIG. 14 is yet another schematic view of a ring SPE network 72 according to some embodiments. The ring SPE network 72 of FIG. 14 can be similar to the ring network of FIG. 13, including the hybrid four-wire trunk cable 48 coupled to the first SPE port 70 of the linking device 54. Furthermore, a separate four-wire cable 133 can be routed from the last tap 46 back to the dual-port linking device 54. The four-wire cable 133 can include an SPE cable pair that connects SPE cable pair 76 and to the second SPE port 70 of the dual-port linking device 54, forming the ring SPE network 72, as well as a power cable pair that connects to the power cable pair 74. The power cable pair of the four-wire cable 133 can be connected back to the in-cabinet power supply 42, or a separate power supply, such an on-machine power supply, in order to provide a power redundancy for the network 72. Thus, the four-wire cable 133 can provide both power and SPE network redundancy to the SPE system 44. Additionally, a dedicated end cap 52D may be positioned at the second port 80/100/122 of the last tap 46 to provide a pass-through for the SPE cable pair 76 and the power cable pair 74 to connect to the additional cable 133.

As yet another example, FIG. 15 is yet another schematic view of a linear SPE network 68 according to some embodiments. The linear SPE network 68 of FIG. 15 can be similar to the ring SPE network 72 of FIG. 12, including the hybrid six-wire trunk cable 48. However, the taps 46 can be connected to a single-port linking device 54 and a dedicated terminator 52E can be coupled to the last tap 46 (e.g., rather than a splicer 52B). In some embodiments, the terminator 52E and the terminator 52A may be the same or different components. Furthermore, in some embodiments, an end cap (not shown) may cover the second SPE cable pair 130 of the leading trunk cable 48 prior to the first tap 46 along the network 68.

As described above, the SPE system 44 can provide a trunk-drop infrastructure via taps 46 that comprise two trunk ports and a drop port. In some embodiments, as shown in FIGS. 16, 17, 18, and 19, the SPE system 44 can include multi-drop taps 46F, 46G, 46H, 46I respectively, that comprise two trunk ports and two or more drop ports. More specifically, FIG. 16 is a schematic view of a multi-drop passive tap 46F, according to some embodiments, for use with the SPE system 44. FIG. 17 is a schematic view of a multi-drop SPE tap 46G, according to some embodiments, for use with the SPE system 44. FIG. 18 is a schematic view of a multi-drop powered passive tap 46H, according to some embodiments, for use with the SPE system 44. FIG. 19 is a schematic view of a mixed multi-drop tap 46I, according to some embodiments, for use with the SPE system 44.

With reference to FIG. 16, the multi-drop passive tap 46F may act similar to the passive tap 46C of FIG. 12, but is capable of being coupled to multiple SPE devices 30B/32B. Accordingly, like the passive tap 46C of FIG. 12, the multi-drop passive tap 46F can include a first trunk port 98, a second trunk port 100, and multiple third drop ports 102 (e.g., 102-1 . . . 102-n). More specifically, the first and second ports 98, 100 can each connect to a power cable pair 74, a first SPE cable pair 76, and a second SPE cable pair 130 of trunk cables 48. Each third port 102 can connect to a drop cable 50 (e.g., drop cable 50B, not shown in FIG. 16) configured to connect to an SPE device 30B/32B. For example, internally, the power cable pair 74 can extend through the multi-drop passive tap 46F between the first and second ports 98, 100, with connections branching off to the third ports 102-1 . . . 102-n, e.g., to connect the power cable pair 74 to the respective drop cables 50B. The first SPE cable pair 76 can connect from the first port 98 to the third port 102-1, and back from the third port 102-1 to the third port 102-n, and back from the third port 102-n to the second port 100, thus coupling each SPE device 30B/32B connected to a respective third port 102 to the IP subnet trunkline 56. Additionally, the second SPE cable pair 130 can pass through the tap 46F between the first port 98 and the second port 100 to create a ring network infrastructure (e.g., when coupled between a linking device 54 and a splicer 52B). Accordingly, the multi-drop passive tap 46F can act as a pass-through for power and data communication lines to multiple SPE devices 30B/32B. Furthermore, the multi-drop passive tap 46F can provide linear-style connections (e.g., multiple devices 30B/32B arranged in a linear formation off of the tap 46F), or star- or tree-style connections (e.g., multiple devices 30B/32B arranged in a star or tree-like formation off of the tap 46F).

With reference to FIG. 17, the multi-drop SPE tap 46G may act similar to the SPE tap 46A/B of FIG. 12, but is capable of being coupled to multiple legacy devices 30A/32A. Accordingly, like the SPE tap 46A/B of FIG. 12, the multi-drop SPE tap 46G can include a first trunk port 78, a second trunk port 80, and multiple third drop ports 82 (e.g., 82-1 . . . 82-n). More specifically, the first and second ports 78, 80 can each connect to a power cable pair 74, a first SPE cable pair 76, and a second SPE cable pair 130 of trunk cables 48. Each third port 82 can connect to a drop cable 50 (e.g., drop cable 50A, not shown in FIG. 17) configured to connect to a legacy device 30A/32A. For example, internally, the power cable pair 74 can extend through the multi-drop SPE tap 46G between the first and second ports 78, 80, with connections branching off to the third ports 82-1 . . . 82-n, e.g., to connect the power cable pair 74 to the respective drop cables 50A. The first SPE cable pair 76 can connect from the first port 78 to the second port 80 via an internal dual-port SPE switch 84. Additionally, the second SPE cable pair 130 can pass through the tap 46G between the first port 78 and the second port 80 to create a ring network infrastructure (e.g., when coupled between a linking device 54 and a splicer 52B). Accordingly, the multi-drop SPE tap 46G can include a dedicated SPE switch 84 (or multiple SPE switches 84, in some embodiments) to integrate multiple legacy devices 30A/32A into the SPE system 44 through the trunk-drop infrastructure. Furthermore, the multi-drop SPE tap 46G can provide linear-style connections (e.g., multiple devices 30A/32A arranged in a linear formation off of the tap 46G), or star- or tree-style connections (e.g., multiple devices 30A/32A arranged in a star or tree-like formation off of the tap 46G).

With reference to FIG. 18, the multi-drop powered passive tap 46H may act similar to the powered passive tap 46E of FIG. 10, but is capable of being coupled to multiple powered SPE devices 30C/32C. Accordingly, like the powered passive tap 46E of FIG. 10, the multi-drop powered passive tap 46H can include a first trunk port 120, a second trunk port 122, and multiple third drop ports 124 (e.g., 124-1 . . . 124-n). More specifically, the first and second ports 120, 122 can each connect to a power cable pair 74 and an SPE cable pair 76 of trunk cables 48. Each third port 124 can connect to a drop cable 50 (e.g., drop cable 50C, not shown in FIG. 18) configured to connect to a powered SPE device 30C/32C. For example, internally, the power cable pair 74 can extend through the multi-drop powered passive tap 46H between the first and second ports 120, 122, with connections branching off to power couplers 128, e.g., to connect the power cable pair 74 to SPE downlink pairs of the third ports 124-1 . . . 124-n and respective drop cables 50C. The SPE cable pair 76 can connect from the first port 120 to the third port 124-1, and back from the third port 124-1 to the third port 124-n, and back from the third port 124-n to the second port 122, thus coupling each powered SPE device 30C/32C connected to a respective third port 124 to the IP subnet trunkline 56. Accordingly, the multi-drop powered passive tap 46H can act as a pass-through for power and data communication lines to multiple powered SPE devices 30C/32C. Furthermore, the multi-drop powered passive tap 46H can provide linear-style connections (e.g., multiple devices 30C/32C arranged in a linear formation off of the tap 46H), or star- or tree-style connections (e.g., multiple devices 30C/32C arranged in a star or tree-like formation off of the tap 46H).

With reference to FIG. 19, the mixed multi-drop tap 46I incorporate connections similar to different kinds of taps 46 described above, such as the passive tap 46C and the powered passive tap 46E of FIG. 10 so that it is capable of being coupled to multiple different types of SPE devices 30B/32B, 30C/32C. Accordingly, the mixed multi-drop tap 46I can include a first trunk port 120, a second trunk port 122, and multiple third drop ports 124 (e.g., 124-1 . . . 124-n). Accordingly, the first and second ports 120, 122 can each connect to a power cable pair 74 and an SPE cable pair 76 of trunk cables 48. Each third port 124 can connect to a drop cable 50 (e.g., drop cable 50B or drop cable 50C, not shown in FIG. 19) configured to connect to an SPE device 30B/32B or powered SPE device 30C/32C. For example, internally, the power cable pair 74 can extend through the mixed multi-drop tap 46I between the first and second ports 120, 122, with connections branching off to power couplers 128, e.g., to connect the power cable pair 74 to SPE downlink pairs of the third ports 124-1 . . . 124-n and respective drop cables 50C, or with connections branching off to the third ports 124-1 . . . 124-n, e.g., to connect the power cable pair 74 to the respective drop cables 50B. The SPE cable pair 76 can connect from the first port 120 to the third port 124-1, and back from the third port 124-1 to the third port 124-n, and back from the third port 124-n to the second port 122, thus coupling each SPE device 30B/32B, 30C/32C connected to a respective third port 124 to the IP subnet trunkline 56. Accordingly, the mixed multi-drop tap 46I can act as a pass-through for power and data communication lines to multiple SPE device 30B/32B and/or powered SPE devices 30C/32C. Furthermore, the mixed multi-drop tap 46I can provide linear-style connections (e.g., multiple devices 30B/32B, 30C/32C arranged in a linear formation off of the tap 46I), or star- or tree-style connections (e.g., multiple devices 30B/32B, 30C/32C arranged in a star or tree-like formation off of the tap 46I). It should also be noted that, while the multi-drop passive tap 46F and the multi-drop SPE tap 46G are shown and described with connections for a ring SPE network 72, and the multi-drop powered passive tap 46H and the mixed multi-drop tap 46I are shown and described with connections for a linear SPE network 68, it is within the scope of this disclosure to include multi-drop tap 46F, 46G, 46H, 46I having respective connections for a linear SPE network 68 or a ring SPE network 72.

Additionally, some embodiments can provide a method of forming an SPE network 68/72 within an industrial automation system 40. For example, the method can include forming the IP subnet trunkline 56 using the trunk cables 48, connecting a first device 30/32 to the IP subnet trunkline 56, e.g., by connecting the trunk ports of a respective tap 46 to the trunk cables 48, connecting a drop port of the tap 46 to a drop cable 50, and connecting the first device 30/32 to the drop cable 50. The method can also include connecting subsequent devices 30/32 to the IP subnet trunkline 56 in the same manner (e.g., by connecting the trunk ports of a respective tap 46 to the trunk cables 48, connecting a drop port of the tap 46 to a drop cable 50, and connecting the respective device 30/32 to the drop cable 50. The method can further include connecting a final, last-hop device 30/32 to the IP subnet trunkline 56, e.g., by connecting one of the trunk ports of a final tap 46 to the trunk cable 56, connecting a drop port of the final tap 46 to a drop cable 50, and connecting the last-hop device 30/32 to the drop cable 50. The method can also include connecting an end cap 52 to the other trunk port of the final tap 46, and connecting one of the trunk cables 48 to the linking device 54 (e.g., that is connected to a wired network of the industrial automation system 40).

Additionally, by using a terminator 52A as the end cap 52, a linear SPE network can be formed. Alternatively, by using a splicer 52B as the end cap 52, a ring SPE network can be formed. Also, a placeholder can be added to the IP subnet trunkline 56 by connecting the trunk ports of a respective tap 46 to the trunk cables 48 and connecting a drop port of the tap 46 to a splicer 52B.

In light of the above, some embodiments provide an industrial SPE network including a linking device, sensor and/or actuator devices, and a trunk-drop network infrastructure connecting the sensor/actuator devices, including passive or SPE taps (such as three-port or multi-port taps), trunk cables, drop cables, and an end cap. The trunk-drop infrastructure can form a linear SPE network with bus power using a two-pair trunk cable (e.g., a first cable pair for linear SPE and a second cable pair as a power bus) and a terminator. The trunk-drop infrastructure can form a ring-SPE network with bus power using a two-pair trunk cable (e.g., a first cable pair for linear SPE and a second cable pair as a power bus) and a separate single-pair cable (e.g., a loop-back SPE pair). The trunk-drop infrastructure can form a ring-SPE network with bus power using a three-pair trunk cable (e.g., a first cable pair for forward linear SPE, a second cable pair as a power bus, and a third cable pair for loop-back SPE), and a splicer creating a ring by connecting the forward linear SPE pair and the loop-back SPE pair. The trunk-drop infrastructure can form a linear SPE network with bus power using a three-pair trunk cable (e.g., a first cable pair for forward linear SPE, a second cable pair as a power bus, and a third cable pair for loop-back SPE), where the third cable pair remains open.

Generally, the on-machine industrial SPE systems described herein provide a combination of an SPE network (with linear or ring arrangement) and a bus power network in a physical trunk-drop network infrastructure, which can simplify the power and communication infrastructure compared to prior systems and can enable location-based services. The SPE systems described herein can further provide CIP, IP, and SPE connectivity to the last-hop field-constrained devices, which can provide great user experiences and better system integration, and also can improve device data analytics capabilities, thus enabling a new series of innovation in industrial automation. The SPE systems described herein can also include safety and standard constrained devices, as well as legacy and new SPE devices, all on the same SPE network, which further simplifies network infrastructure, reduces the skill level of labor when building such systems, and can thus serve both Brownfield and Greenfield applications.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An industrial Single Pair Ethernet (SPE) system to be installed within an industrial automation system, the industrial SPE system comprising:
   a linking device;
   a first device comprising one of a sensor and an actuator;
   a second device comprising one of a sensor and an actuator;
   a trunk-drop infrastructure connecting the first device and the second device to the linking device, the trunk-drop infrastructure comprising:
      a first tap;
      a first drop cable connecting the first tap to the first device;
      a second tap;
      a second drop cable connecting the second tap to the second device;
      a trunk cable connected between the linking device, the first tap, and the second tap, the trunk cable including a first pair of cables configured to transmit power and a second pair of cables configured as single pair ethernet cables; and
      an end cap connected to the second tap,
   wherein at least one of the first device, the second device, the first tap, and the second tap includes a dual-port SPE switch.

2. The industrial SPE system of claim 1, wherein the end cap is a terminator.

3. The industrial SPE system of claim 1, wherein the trunk cable further comprises a third pair of cables configured as single pair ethernet cables, and the end cap is a splicer configured to connect the second pair of cables to the third pair of cables.

4. The industrial SPE system of claim 1 and further comprising a single pair ethernet cable separate from the trunk cable, the single pair ethernet cable connected to the second pair of cables through the second tap and further connected to the linking device.

5. The industrial SPE system of claim 4 and further comprising a power cable pair separate from the trunk cable, the power cable pair connected to the first pair of cables through the second tap.

6. The industrial SPE system of claim 1, wherein the first tap includes a first trunk port and a second trunk port each connected to the trunk cable, and a drop port connected to the first drop cable.

7. The industrial SPE system of claim 6, wherein:
each of the first trunk port and the second trunk port include two power pins that connect to the first pair of cables;
the first trunk port includes a set of SPE pins that connect to the second pair of cables for uplink SPE; and
the second trunk port includes a set of SPE pins that connect to the second pair of cables for downlink SPE.

8. The industrial SPE system of claim 7, wherein at least the first device includes the dual-port SPE switch and the set of SPE pins that connect to the second pair of cables for the uplink SPE are connected to the dual-port SPE switch of the first device via the first drop cable, and the set of SPE pins that connect to the second pair of cables for the downlink SPE are connected to the dual-port SPE switch of the first device via the first drop cable.

9. The industrial SPE system of claim 8, wherein the first tap includes a power coupler that connects power from the first pair of cables to the second pair of cables.

10. The industrial SPE system of claim 7, wherein at least the first tap includes the dual-port SPE switch and the set of SPE pins that connect to the second pair of cables for uplink SPE are connected to the dual-port SPE switch of the first tap, and the set of SPE pins that connect to the second pair of cables for downlink SPE are connected to the dual-port SPE switch of the first tap.

11. The industrial SPE system of claim 5, wherein the first drop port includes a plurality of drop ports.

12. A method of forming a Single Pair Ethernet (SPE) network within an industrial automation system, the method comprising:
forming an IP subnet trunkline using trunk cables having a power cable pair and an SPE cable pair;
connecting a first device to the IP subnet trunkline by:
connecting a first pair of trunk ports of a first tap to the trunk cables,
connecting a first drop port of the first tap to a first drop cable, and
connecting the first device to the first drop cable;
connecting a second device to the IP subnet trunkline by:
connecting one of a second pair of trunk ports of a second tap to the trunk cables,
connecting a second drop port of the second tap to a second drop cable, and
connecting the second device to the second drop cable,
wherein at least one of the first device, the second device, the first tap, and the second tap includes a dual-port SPE switch;
connecting an end cap to another one of the second pair of trunk ports of the second tap; and
connecting one of the trunk cables to a linking device that is connected to a wired network of the industrial automation system.

13. The method of claim 12 and further comprising forming a linear SPE network by using a terminator as the end cap.

14. The method of claim 12, wherein the SPE cable pair includes a linear SPE cable pair and a loopback SPE cable pair, and further comprising forming a ring SPE network by using a splicer as the end cap and connecting the linear SPE cable pair to the loopback SPE cable pair via the splicer.

15. The method of claim 12 and further comprising connecting a placeholder to the IP subnet trunkline by:
connecting a third pair of trunk ports of a third tap to the trunk cables; and
connecting a third drop port of the third tap to an end cap.

16. An industrial Single Pair Ethernet (SPE) system for connecting devices within an industrial automation system, the industrial SPE system comprising:
a trunkline formed by a series of trunk cables, each trunk cable in the series of trunk cables comprising a power pair and an SPE pair;
one or more taps connected between the trunk cables of the trunkline;
a drop line connected to each of the one or more taps; and
a device connected to each of one or more taps via the drop lines, the device being one of an actuator and a sensor, wherein at least one of the device and the one or more taps includes a dual-port SPE switch.

17. The industrial SPE system of claim 16 and further comprising a terminator connected to one of the one or more taps located at an end of the trunkline.

18. The industrial SPE system of claim 16, wherein the SPE pair includes a linear SPE pair and a loopback SPE pair, and further comprising a splicer connected to one of the one or more taps located at an end of the trunkline, the splicer connecting the linear SPE pair and the loopback SPE pair.

19. The industrial SPE system of claim 16 and further comprising a linking device configured to connected to a wired network of the industrial automation system, the trunkline connected to the linking device.

20. The industrial SPE system of claim 16, wherein the one or more taps includes:
an SPE tap including the dual-port SPE switch and configured to be connected to a device without a dual-port SPE switch; and
a passive tap without a dual-port SPE switch and configured to be connected to a device with the dual-port SPE switch.

\* \* \* \* \*